(12) United States Patent
Torchigin

(10) Patent No.: US 6,771,412 B2
(45) Date of Patent: Aug. 3, 2004

(54) ACOUSTO-OPTICAL DEVICES

(76) Inventor: Vladimir P. Torchigin, 257, 82, Leninsky pr., Moscow (RU), 117421

( * ) Notice: Subject to any disclaimer, the term of this patent is extended or adjusted under 35 U.S.C. 154(b) by 0 days.

(21) Appl. No.: 09/909,706

(22) Filed: Jul. 20, 2001

(65) Prior Publication Data

US 2003/0016434 A1 Jan. 23, 2003

(51) Int. Cl.[7] ............................. G02F 1/11; G02F 1/33
(52) U.S. Cl. ..................... 359/305; 359/313; 359/285; 359/286; 359/287
(58) Field of Search ................... 359/286, 305–314, 359/365, 285–287, 321; 385/7, 15, 24, 27–29, 31, 39

(56) References Cited

U.S. PATENT DOCUMENTS

| | | | | |
|---|---|---|---|---|
| 3,820,037 A | * | 6/1974 | Corcoran | 372/28 |
| 4,025,157 A | * | 5/1977 | Martin | 367/138 |
| 4,348,079 A | * | 9/1982 | Johnson | 359/285 |
| 4,350,917 A | * | 9/1982 | Lizzi et al. | 385/33 |
| 4,548,467 A | * | 10/1985 | Stoerk et al. | 385/65 |
| 5,369,511 A | * | 11/1994 | Amos | 359/15 |
| 5,963,569 A | * | 10/1999 | Baumgart et al. | 372/28 |

* cited by examiner

*Primary Examiner*—Hung Xuan Dang
*Assistant Examiner*—Joseph P Martinez
(74) *Attorney, Agent, or Firm*—John G. Costa

(57) ABSTRACT

The present invention relates to acousto-optic applications of parametric optical apparatuses that use the mechanical energy of elastic oscillations to convert light over a wide range of wavelengths and amplitudes and to generate coherent light.

6 Claims, 21 Drawing Sheets

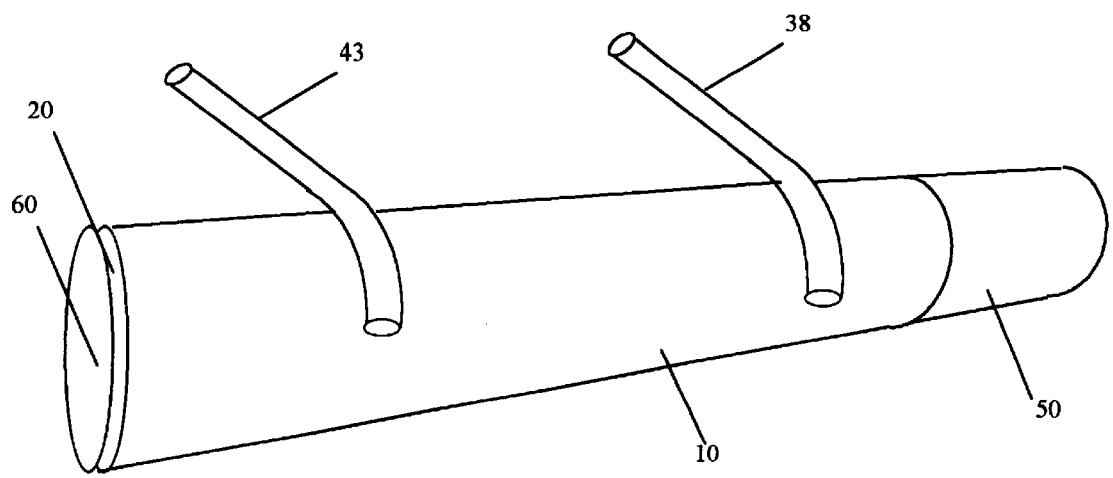
FIGURE 10
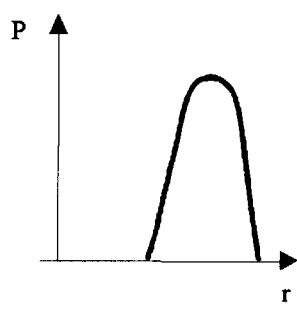 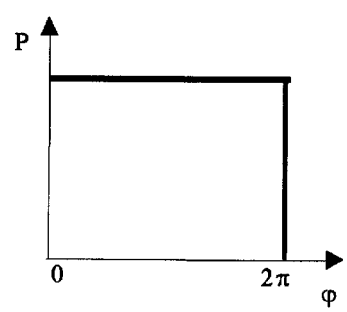
FIGURE 11a    FIGURE 11b a)

b)

c)

ACOUSTO-OPTICAL DEVICES

BACKGROUND OF THE INVENTION

General

Coherent light radiation is converted, amplified and generated to obtain light signals for use in telecommunications, spectroscopy, medicine and so on and to obtain wavelength-division-multiplexing (WDM) signals for use in telecommunications. Unfortunately, the lasers used as sources of coherent light usually have an almost fixed wavelength that can be changed in a relatively narrow wavelength range. An optical parametric converter comprising an optical non-linear crystal (LiNbO$_3$, KTP etc) can convert light from a laser having a fixed wavelength into coherent light having one or more different wavelengths. An optical parametric converter uses one light signal as a feeder, or pump, to convert, or amplify, a second light signal. When a pump light signal with frequency $\omega_p$ and a second light signal with frequency $\omega_s$ are launched in specific directions into a non-linear crystal, those signals interact to generate a signal with frequency $\omega_s+\omega_p$ or $|\omega_s-\omega_p|$. Known optical parametric converters require a powerful coherent light radiation pump, such as, for example, a powerful gas or solid state laser. These lasers are large, heavy, and costly and have a short life.

In the field of acoustooptics, there are known optical devices in which an acoustic wave interacts with a light wave. In most known acoustooptic devices, a light wave's wavelength is preserved. Usually, the spatial distribution of a light wave changes as a result of its interaction with an acoustic wave. However, there are known acoustooptic devices in which the wavelength of a light wave is expressly changed. One such device is based on an acoustooptic Bragg cell. In this device, the frequency of a light wave transmitted through the device is equal to $\omega+\Omega$, where $\omega$ is the frequency of the light wave and $\Omega$ is the frequency of the acoustic wave. That is, in such a device, the interaction of a light wave with frequency $\omega$ and an acoustic wave with frequency $\Omega$ produces a light wave with frequency $\omega+\Omega$.

Another device using converters to directly convert light waves in a fiber has been described. A converter with properties analogous to this device has been disclosed by Risk, et. al. in U.S. Pat. No. 4,872,738 issued Oct. 10, 1989. Like the acoustooptic Bragg cell device, the frequency of the output wave in the Risk device is $\Omega+\omega$.

In Russian Patent #2085984 entitled *Parametric Amplifier and Converter for a Wavelength of Electromagnetic Radiation*, V. P. Torchigan disclosed an acoustooptic device that increases the frequency of an output light wave.

The theoretical considerations of the interaction of an ultrasonic wave and a light wave in a modified Bragg cell in the form of a truncated pyramid have been discussed in a paper by Torchigin. *Enlarged shift of light frequency in a modified Bragg cell.* Torchigin, V. P. and Torchigin, A. V. Pure Appl. Opt. 7 (1998) 763–782.).

An acousto-optic cell (AO cell) with constant cross-section is a well known acousto-optic device that is used widely for switching, modulation, filtering light radiation, light beam deflection and scanning.

In an acousto-optic device, under the proper conditions, the spatial distribution of a light wave may be changed as a result of the interaction of a light wave with an acoustic wave. Such a change in the spatial distribution of a light wave may occur, for example, when a light wave, which usually propagates in free space, is launched in an AO cell, and the light wave interacts with the acoustic wave over a distance of about 1 cm with an interaction time of less than 0.1 ns.

Compared to free space optical configurations that require relatively large amounts of space and materials, integrated optics decrease the size and increase the reliability of acousto-optic devices. Such is the case, for example, in devices in which light waves are propagated in a planar waveguide of a few micrometers thickness.

In the present invention, the same structure acts as a light guide for the light wave and a sound guide for the acoustic wave.

Theoretical

Theoretical considerations are helpful in understanding and explaining the beam deflection used in the novel devices discovered and disclosed by the inventor.

Consider a waveguide in which both an acoustic wave and a light wave are launched. When the wavelength of the light wave is less than the wavelength of the acoustic wave by a factor of about 100, there is, usually, no noticeable interaction between the waves in the waveguide. However, if the light wave has a "whispering gallery" type waveguide mode, its wavelength along the axis of the waveguide can increase significantly enough that the interaction between the waves can be very strong. In addition, varying the cross-section of the waveguide results in other advantages.

Since an AO cell with variable cross-section is considered to be a waveguide, the means for entering light radiation in an AO cell are similar to the means used for entering light radiation into waveguides. There are known means for entering light radiation through an end face of a waveguide and various coupling devices for entering light radiation through a side surface of a waveguide. Both types of means are used in the present invention. The type of coupling used depends on the specific application.

In general, in this disclosure, an AO cell is a sound guide. Typically, the sound guides used in this invention are wave guides suitable for functioning as both sound guides and light guides.

In a conical waveguide (usually called a focon or focusing cone) fabricated from a homogeneous linear isotropic optical medium, even a very small change in the direction of an input beam incident on the wide face, or base, of the focon, results in a significant change in the direction of an output beam reflected from the wide face, or base, of that focon.

Since a modified AO cell with variable cross-section along its axis is a waveguide with variable cross-section, the known peculiarities of the propagation of light waves in a waveguide with variable cross-section are applicable.

Geometrical Optics Approximation

Consider an input beam of light that enters a focon at a point on the base near the side surface of the focon. If the direction of the input light beam lacks a radial component (that is, the projection of the input light beam on a radius that extends from the center of the base of the focon through the entry point of the light beam equals zero) and the light beam first strikes the side of the cone at a point just below the base, the trajectory of the beam in the focon looks like a conical spiral with decreasing intervals between its coils as the beam travels from the base towards the narrow end of the focon.

The beam spirals inside the cone to a point R, where R is the point of maximal penetration of the beam into the cone. The distance from R to the vertex O of the cone is determined by the equation $OR=\rho[1-\sin\alpha]$, where OR is the length of the straight line drawn from the vertex of the cone to the point of maximal penetration, where A is the point at which the input beam first strikes the side surface of the cone, $\rho$ is the length of the straight line drawn from the vertex of the cone to the point A, and $\alpha$ is the angle that the input light beam makes with the straight line OA.

Once the beam reaches maximal penetration, the beam reverses direction relative to the axis of the focon and travels towards the base. That is, the point of maximal penetration is also a return point. The angle that an exit beam makes with the straight line OB drawn from the vertex to the point B, where B is the point at which the beam travelling within the focon last strikes the side surface of the cone, is the same angle $\alpha$ that the incident input light beam made with the straight line OA. The location of exit point B of the output beam varies dependent on the angle $\alpha$. That is, there exists an angle $\psi$ such that $\Delta\psi=2\Delta\alpha/\gamma$ (where $\gamma$ is the taper of the focon) whereby as $\alpha$ changes $\psi$ changes and the exit point B moves along a circle drawn on the side surface of the focon near the base of the focon. That is, the direction of the azimuth component of the point B varies in the range 0 . . . 360°, as $\alpha$ changes. Thus a small change in the angle $\alpha$ results in a significant change in the location of the exit point.

Now let a travelling azimuth independent acoustic volume wave with longitudinal oscillations propagate along the axis of the focon towards its tapered end. As is known, due to photo-elastic effects, an acoustic wave changes the refraction index n of the medium in which it propagates. As a consequence of this phenomenon, in a focon, an acoustic wave forms a periodic structure that moves at the velocity of the acoustic wave. This structure acts like a distributed Bragg reflector (DBR). As is known from acousto-optics, a travelling plane light wave reflects from a plane acoustic wave if the following so called Bragg condition $(kK)=K^2/2$ is satisfied, where k is the wave vector of the light wave and K is the wave vector of the acoustic wave. (The point at which the condition $(kK)=K^2/2$ is satisfied is a return point.) The same effect occurs in a waveguide with a periodic structure and is used widely in the design of waveguide filters. The Bragg condition can be rewritten in the following form $2k \cos\theta=K$ where $\theta$ is the angle between the wave vectors k and K. In a focon, the angle $\theta$ tends to 90° as the light beam travels to the return point.

Usually the wavelength of the acoustic wave $\Lambda$ is much greater than the wavelength of the light wave $\lambda$. Since $k=2\pi/\lambda$ and $K=2\pi/\Lambda$, $K<<k$, the Bragg condition is satisfied when $\theta$ is close to 90°. In a focon, the angle $\theta$ corresponds to the angle between the axis of the focon (the direction of the wave vector of the acoustic wave) and the direction of the light beam (the direction of the wave vector of the light wave). It follows that, in a focon, there always exists a point where the angle $\theta$ is close to 90° and the Bragg condition is satisfied. Thus, in a focon, the position of the return point of a light beam can be changed by the presence of an acoustic wave. The distance r between the new return point (that is the return point when an acoustic wave is present) and the vertex of the cone is determined by the equation $r=R/\sin\theta$, where $\theta$ is determined from the equation $2k \cos\theta=K$. Thus, the presence of an acoustic wave moves the return point closer to the base. As a result, the trajectory of a light beam and its exit point can be changed by the presence of an acoustic wave. In this manner, the acoustic wave can control the light beam.

The geometrical optics approximation takes known acousto-optics phenomena into account and assists in understanding the main idea and principles upon which the apparatuses disclosed in this invention are based. The general case where the apparatus comprises a body of rotation with variable diameter along axis can be described using a wave optics approach.

Wave Optics Approach

Using a waveguide approach, an AO cell can be thought of as a waveguide with a slowly-variable cross-section and a "whispering gallery" mode travelling light wave can be thought of as a travelling light wave that rotates around the axis of the waveguide and shifts slowly in an axial direction. When total reflection from the side surface of a body of rotation is present, the waveguide confines a light wave.

It is known that the waveguide mode of an electromagnetic wave is preserved when the wave propagates along a waveguide with slowly-variable cross-section. This means that the number of variations of the electromagnetic field in cross-section is constant and, therefore, the period of the electromagnetic field in the cross-section $\lambda_\perp$ is proportional to its diameter D, i.e. $\lambda_\perp \sim D$. Since projection $k_\perp$ of wave vector k on the plane of a cross-section varies in inverse proportion to $\lambda_\perp$, $k_\perp \sim 1/D$. The dependence of the propagation constant $k_=(z)$ of a light wave along the axis of the waveguide on its position z along that axis can be obtained from the following relations $$k^2_\perp(z)-k^2_=(z)=k^2, \quad (1\text{-}i)$$

$$k^2_\perp(z)=k^2_\phi(z)+k^2_r(z) \quad (2\text{-}i)$$

$$k_\phi(z)/k_r(z)=k_\phi(0)/k_r(0), \quad (3\text{-}i)$$

$$k_\perp(z)D(z)=k_\perp(0)D(0), \quad (4\text{-}i)$$

$$k_=(0)=k \cos\theta \quad (5\text{-}i)$$

where $k_\perp(z)$ is the component of the wave vector that is perpendicular to the axis, $k_\phi(z)$ and $k_r(z)$ are the azimuth and radial components of the wavevector, respectively, D(z) is the diameter of the waveguide at point z, $\theta$ is the angle of incidence of the light beam on the base of the waveguide at $z=0$. If the dependence of D(z) on z, the position along the axis of the focon, is known, one can determine the dependence propagation constant of a light wave in the waveguide $k_=(z)$. Then, the location of the return point on the z-axis can be determined from the condition $k_=(z)=K/2$.

The limitation on the radial component of an incident input beam, introduced above in a geometric optics approximation for the sake of simplicity and understanding only, is not needed when a waveguide approach is used. In fact, the existence of a radial component $k_r$ improves the interaction between acoustic and light waves because the greater is $k_r$ the wider is the ring in which light radiation is present. This results in an increase of the overlapping of the acoustic and light waves. However, the increase of $k_r$ is limited by the condition of total reflection from the side surface of the waveguide. That is, the condition $k_r<k(n^2-1)^{1/2}$ must remain valid, where n is the index of refraction of the optical medium from which the waveguide is fabricated.

Generalization

The foregoing waveguide theory can be applied to a focon and other bodies of rotation, as well as to structures having a regular polygonal cross section and structures having cross sections that satisfy the condition of having total reflection of light ray trajectories from their side surfaces.

It is important to determine the relation between the taper of a focon and the intensity of an acoustic wave. It is known from DBR theory that the greater the index of modulation m of the refractive index n, the greater is the index of reflection $\Gamma$ of the DBR. Also, the less detuning $\delta=k_=-K/2$ the more $\Gamma$. The ability of a DBR to reflect disappears when $\delta/k_=>m$.

On the other hand, in a focon, $k_=$ is not constant and depends on z. The greater the taper of the focon, the greater the change in $k_=(z)$ along the z axis (that is, the longitudinal axis of the focon or body of rotation) and lesser the length of the DBR, i.e. the segment of the waveguide where $\delta/k_=<m$. Thus, in order to preserve the ability of the DBR to reflect, an increase in the taper of the focon must be accompanied by an increase in the index of modulation m. The known DBR theory is valid only for small m and δ. Because a focon is considered to be a waveguide whose cross-section changes along its axis, the index of modulation M of the propagation constant $k_-$ must be used instead of the index of modulation m. As is shown in the paper Torchigin V. P., Torchigin A. V. Enlarged shift of light frequency in a modified Bragg cell. *Pure and Applied Optics,* vol.7, 763–782 (1988) M>>m in the vicinity of the return point. In this case, the DBR theory for small m and δ is not valid and a direct solution for the propagation of light in a waveguide with a variable propagation constant along the axis of the waveguide is required. An approximate value of the index of modulation m required for operating can be obtained from the relation m=σ where σ=(dD/dz)/(2πD/Λ), where Λ is the wavelength of the acoustic wave.

Those interested in a more detailed description of the theoretical considerations presented in the foregoing paragraphs are referred to the paper by Torchigin V. P., Torchigin A. V. Enlarged shift of light frequency in a modified Bragg cell. *Pure and Applied Optics,* vol.7, 763–782 (1988).

SUMMARY OF THE INVENTION

General

The Torchigin paper discusses frequency conversion, amplification and generation of light radiation by means of an acoustic wave. The present invention discloses additional findings in those areas and introduces applications in the areas of deflection, modulation switching and light radiation filtering.

Note that in this disclosure a focon is often used for simplicity of understanding. However, the embodiments disclosed will function with a body of rotation provided that the limiting criteria are met. And the inventor intends that the disclosure be read with this generalization to a body of rotation in mind. Also note that the terms axis of a focon and z-axis are used interchangeably to denote the axis drawn from the base of a cone to its vertex, or imaginary vertex in the case of a truncated cone.

Furthermore, although the embodiments disclosed can function as stand alone apparatuses it is to be noted that they can also function as a section of another apparatus. For example, a tapered cone segment can be incorporated into a fiber or glass cable.

The invention is suitable for use in various applications and the particular preferred embodiment depends on the particular application.

An objective of this invention is to provide methods and apparatuses for deflecting, modulating, switching and filtering light radiation by means of an acoustic wave. The invention facilitates and controls the interaction of an acoustic wave propagated along the axis of a wave guide and a "whispering gallery" mode light wave introduced into that same wave guide to achieve the desired results, such as, for example, the deflecting, modulating, switching and filtering of light radiation.

The invention discloses how selection of acoustic wave parameters, such as amplitude and frequency, and the profile of the wave guide can be used to manipulate the propagation of light waves to achieve the desired results.

In general, the apparatus comprises a body, an optional acoustic transducer or other means of introducing an acoustic wave into the body, at least one light input means and at least one light output means.

Optionally, the body is a body of rotation. The body is made of a suitable glass material. In this application, the terms "glass" and "suitable glass material" are used generically to indicate any medium, suitable for the transmission of light, in which the rate of attenuation of light radiation is sufficiently low to permit conversion or amplification or other functions of the apparatuses disclosed herein. For example, in a disclosed apparatus that requires the interaction of an acoustic wave and a light wave, the suitable glass material is one that permits said interaction. The glass may be homogeneous or inhomogeneous. At least part of the body is tapered. A tapered part of a body extends from a broad base to a narrow end and comprises an axis extending from the broad base to the narrow end. An example of such a tapered part of a body is a truncated cone, also known as a focon. Preferably the tapered part tapers gradually from a broad base to a narrow end. Also, preferably, the tapered part is symmetrical with respect to a central axis that extends from the centre of the broad base to the centre of the narrow end. Furthermore, it is preferable that, in any cross section cut perpendicular to the axis of the tapered part, the index of refraction decreases as the distance from the axis increases. It is also preferable that any cross section cut perpendicular to the axis of the tapered part of the body is either a regular polygon or a circle. Suitable shapes for the body include cylinders, cones and pyramids. A cylinder may have an elliptical base or any polygon as a base. Thus, recalling that a circle is an ellipse in which the axes of the ellipse are equal, an elliptical cylinder includes a tube with a circular base. A common example of the use of a cylinder with a polygonal base (i.e. a rectangular cylinder) is a milk carton. Suitable symmetrical shapes for the body include, but are not limited to, cylinders and cones with circular or elliptical bases and pyramids with square, rectangular, and regular hexagonal bases. The narrow or tapered end of a cone or pyramid used in this invention may be truncated. Optionally, the narrow or tapered end of a body is truncated. Also, optionally, the tapered or truncated end comprises a matching load. Furthermore, the body may optionally comprise a hollow or solid core and the refractive index of the core may be different from the refractive index of the remainder of the body. Also, optionally, the body may comprise a coating that has a different refractive index from the remainder of the body. Furthermore, said coating may provide a reflective surface for the remainder of the body.

Preferably, the acoustic wave introduced into the body is either a Lamb wave or a surface acoustic wave or a travelling acoustic wave.

Preferably, the electromagnetic field of a light wave input into the body is in the form of a waveguide mode of the "whispering gallery" type. One input means suitable for such light wave input is an optical coupling prism.

In a given embodiment, a light input means may be closer to or farther from the base of a tapered part of the body than an output means, such placement dependent on the purpose of the apparatus of the particular embodiment.

A feature of a tapered part of the body of the invention is that the taper is sufficiently gradual to permit the function of the particular embodiment disclosed. In the truncated cone, the taper can be calculated from equation (3), namely, σ=(dD/dz)(Λ/2π)D$^{-1}$. One knowledgeable in the art will recognise that corresponding equations for the taper can be used for the particular shape of the tapered part being used in a given embodiment. It is important to note that as long as the tapering equation corresponding to the particular embodiment is satisfied, the principles disclosed in this application are valid. Thus, although the embodiments are typically described using a truncated cone as the body or part of the body, one skilled in the art will recognise that the body can take on any shape, and need not be symmetrical. Accordingly, for example, the principles disclosed herein can be employed in constructing a flexible cable that has a cross section that varies irregularly along its length and that curves as needed by the particular connections required.

For simplicity, the term "body" is used in the descriptions of the embodiments of this invention, but one skilled in the art will recognise that the embodiments disclosed may be a section or a part of another apparatus. For example, a cable may comprise one or more truncated conical parts or sections interspersed along the length of the cable.

One should also note this invention discloses various means to confine light and acoustic waves. Advantages of the confinement of light or acoustic waves include permitting one to take advantage of various properties of those waves, limiting energy losses from those waves, and, when both acoustic and light waves are present simultaneously, enhancing the interaction of those waves.

Technical Principles

The discussion that follows will be useful for an understanding of the prior art and the theory of light conversion in parametric systems with very low pump frequency as applied to the inventions herein disclosed.

For simplicity, the principles in the following paragraphs are discussed in relation to simple structures, such as, for example, a focon. However, these principles are applicable to more complex structures provided that the corresponding conditions are satisfied, as is the case, for example, when an equation corresponding to a complex is substituted for the equation disclosed for a simple structure.

The invention disclosed herein takes advantage of the development of glass with extremely small losses (for example, less than 0.2 Db/Km) for the conversion and amplification of light. Such glass is used in the fabrication of optical fibers. In this application, the term "glass" is used generically to indicate any medium, suitable for the transmission of light, in which the rate of attenuation of light radiation is sufficiently low to permit said conversion and/or amplification. As the dissipative losses increase the efficiency of conversion decreases. As the dissipative losses of the glass in an acousto-optic device decrease, the time of conversion in that device increases and the frequency of the pump in that device decreases. Although glasses are available in which the attenuation of light radiation is less than 0.2 Db/Km, depending on the application, greater dissipative losses can be acceptable.

In Russian Patent #2085984 (2085984RU), Torchigin disclosed means for the conversion and amplification of light radiation. In Patent 2085984RU, conversion is performed in a truncated glass cone (or focon), wherein an acoustic transducer attached to the wide base of the focon excites a traveling acoustic wave that propagates along the focon and is absorbed by a matching load attached to the tapered end of the focon. A matching load absorbs an acoustic wave and decreases, and preferably eliminates, reflection of the acoustic wave. Light radiation enters the focon through an input coupling prism attached to the side surface of the focon and light radiation is extracted from the focon through an output coupling prism attached to the side surface of the focon.

The acoustic transducer generates a traveling acoustic wave with a frequency of about 100 MHz. When propagated in a focon, a traveling acoustic wave changes the pressure of the medium through which the acoustic wave propagates. As the refractive index of the medium depends on the pressure in the medium, a change in pressure results in a change in the refractive index. In effect, as the acoustic wave travels in a focon, there is a wave of change of the refractive index of the medium. This wave of change travels at the same phase velocity as the acoustic wave, about 6000 m/s. The distance between adjacent (consecutive) peaks along the longitudinal axis of the focon is equal to $\Lambda$, where $\Lambda$ is the wavelength of the acoustic wave. Light radiation that enters a focon through an input coupling prism excites a light wave that has a "whispering gallery" mode (WGM) electromagnetic field. As a result of the parametric interaction between the acoustic and light waves, the frequency and energy of the light wave increase. That is, under suitable conditions, after a light wave interacts with an acoustic wave, the energy of the resultant light wave equals the summation of the energy of the initial light wave plus the energy extracted from the acoustic wave. As the resultant light wave propagates under an output coupling prism energy is extracted from the resultant light wave and is used as an output signal.

Note that in the discussion that follows different descriptions (time of interaction, time of conversion, etc.) of $\tau$ are used for clarity of explanation and are interchangeable.

A radical decrease in pump frequency does not contradict the physics of parametric interaction. It is known from the physics of parametric amplification that the energy of an amplified signal in a lossless parametric system increases by a factor of about $(1+2\pi m)$ over one period of modulation or one period of the pump, where m is the index of modulation of a parameter that characterizes the energy stored in the parametric amplifier. Then, the energy of the light signals increases by a factor of $(1+2\pi m)^{1/2\ \pi m} \cong e$ over $$N = 1/2\pi m \qquad (1)$$

periods of modulation. We can assume that the strength of parametric interaction S is characterized by the time $\tau$ that is required to increase the energy of a light signal e times. As $\tau$ decreases S increases. In the case under consideration, $\tau = 1/(2\pi mF) = 1/(m\omega_p)$. Thus, as either m or $\omega_p$ increases, the strength of parametric interaction increases. It is not surprising that an increase in either m or $\omega_p$ is accompanied by additional difficulties.

In this context, the question arises as to what degree decreasing the strength S is allowable? Increasing the time of interaction $\tau$ entails increasing light losses. Therefore, the strength S can be decreased until the efficiency of parametric amplification is acceptable.

A clearer understanding is obtained when concrete values of the index of modulation m and the pump frequency $\omega_p$ are used. For example, if $m=10^{-4}$, the energy of light radiation increases by a factor of e, independently of the value of the pump period T, in $10^4/2\ \pi \cong 1500$ periods of the pump. If a prior art optical parametric amplifier has an optical pump with wavelength $\lambda_0=0.6\ \mu$, then the period of the pump is $T=2*10^{-15}$ s and the time of conversion is $\tau=1500\ T=3*10^{-12}$ s. Since the losses in a nonlinear crystal are about 0.2 Db/cm, or about $0.6*10^{10}$ Db/s, the losses in time $\tau$ equal 0.018 Db. Therefore, the time of amplification in the nonlinear crystal can be increased by a factor of about 100, at least. On the other hand, if the frequency of a pump equals 100 MHz, then 1500 periods occur in 15 $\mu$s. Because the group velocity of a light signal in the medium is about $2*10^8$ m/s, the light signal transverses 3 Km in 15 $\mu$s. Until recently, there was no optical medium through which light could transverse such a large distance without evident losses. Therefore, it was impossible to use a pump having a significantly decreased frequency F. The situation changed radically when the glasses for the fibers used in telecommunication were developed. Light losses from these fibers are minimal, about 0.2 Db/Km.

Although, glass fiber is not a nonlinear medium, it is known from the principles of acoustooptics that its refractive index m can be modulated. This modulation can be explained by the photo-elastic effects that are present in frequency ranges up to a few gigaherts.

Thus, simple calculations demonstrate that a low frequency pump can be used for conversion and amplification of high frequency radiation provided that total losses are acceptable for a given situation. However, these considerations are not useful in determining what optical device can be used for this purpose.

In a focon, regions in which the refraction index has been increased by one or another means function like an open dielectric resonator. It turns out that these regions can store light radiation launched into them. The best known specimen of this type of resonator is a small glass ball with a diameter of about one millimetre or less. Similar resonators, such as "whispering gallery" mode resonators, have a very large quality factor of about $Q=10^9$. Such resonators are used, for example, in semiconductor lasers to provide high stability of the output light frequency.

A resonator mode of the "Whispering Gallery" type can be thought of as a light wave that travels along the equator of a ball. The total length of a light wave travelling along the equator of a glass ball is equal to an integer number of the wavelength of that light wave in glass. And, in general, the total length of a light wave travelling around the equator of a sphere made of a given medium is an integer number of the wavelengths of that light wave in that medium.

Generally, a resonator mode of the "Whispering Gallery" type can be obtained on any cylindrical surface or barrier with a smooth curvature. Accordingly, the invention herein disclosed is applicable to waveguides with smooth curvilinear surfaces.

For the sake of simplicity, consider one of the simplest resonator modes of the "Whispering Gallery" type, namely, a resonator mode in which a light field is concentrated in a narrow band (strip) near the equator of a ball and does not penetrate deeply inside the ball. Indeed, the tendency of a light wave to propagate straight forward causes the light wave to strike against the outer surface of the ball. As a result, straight-forward propagation of the light wave is impossible due to numerous sequential reflections of the light wave from the spherical glass-air boundary.

The confinement of a light wave to a region near the equator and its absence in regions near the poles is explained by the peculiarities of a light wave's reflection from a spherical surface. Any light wave deflected from the equatorial plane reflects so that the deflection decreases or reverses direction. That is, any light wave deflected from the equatorial plane reflects off the surface of the sphere back towards the equatorial plane. The fact that the diameter of a cross-sectional plane that is parallel to the equatorial plane decreases as the distance from the equator increases contributes to confining a light wave in the region near the equator.

Another example of the use of a resonator mode of the "Whispering Gallery" type is an open dielectric resonator in the form of a disk. Similar resonators are widely used for electromagnetic waves having a wavelength in the millimetre range. As in the ball, due to the phenomenon known as total internal reflection, the propagation of a light wave along a radius of a disk is confined by reflections from the cylindrical surface of the disk. Furthermore, propagation of a light wave along an axis of a disk is confined by the two circular surfaces of the disk. The wave reflects from the circular surfaces of the disk due to the same phenomenon of total internal reflection. Thus, the wave is completely confined by the surfaces of the disk.

The same result is obtained when one thinks of a disk as a planar dielectric waveguide (such as, for example, an infinite plane film or plate) confined by a cylindrical surface, where the axis of the cylinder is perpendicular to the plane of the waveguide. The propagation of a light wave in a disk is similar to the propagation of a light wave in a planar waveguide, except that, in the disk, the cylindrical surface of the disc, similar to the spherical surface of the ball, confines propagation of the resonator mode of the "whispering gallery" type in the radial direction.

The greater the index of modulation $m=\Delta n/n$ of the refractive index of an acoustic wave and the lesser the taper of a focon, the more favourable are the conditions for confining light radiation by a dielectric resonator. In the limiting case, when the frequency of an acoustic wave F is small enough the condition takes the following simple form $$m > \sigma, \quad (2)$$

where σ characterises the taper of the focon and is determined as follows $$\sigma = (dD/dz)(\Lambda/2\pi)D^{-1} \quad (3)$$

where D is the diameter of the cross-section of the focon, z is distance along the z-axis of the focon, $\Lambda = v_a/F$, $v_a$ and F are the velocity and frequency of the acoustic wave, respectively.

As follows from (3), σ is equal to the relative change of the diameter of the focon $\Delta D/D$ at distance $\Lambda/2\pi$. Thus, in accordance with (2), moving open dielectric resonators can appear in a focon if the intensity of an acoustic wave exceeds a certain limit.

However, the time of conversion should be decreased as much as possible to minimise losses of light radiation. Since a certain number of periods of an acoustic wave are required for a given conversion, the time of conversion decreases as the period of an acoustic wave decreases and its frequency increases. The same conclusion can be obtained from expression (3). Actually, as F increases, Λ decreases, the total length of the focon decreases and the total time of conversion decreases. Furthermore, total dissipate losses decrease because they are proportional to the time of light propagation or the time of conversion. However, as follows from (2) and (3), a decrease in Λ, requires an increase in σ and m.

The optimal frequency F of an acoustic wave depends on many factors. In particular, it depends on the definition of the word "optimal" in a given situation. Considerations for choosing the optimal F are discussed in a paper by V. P. Torchigin and A. V. Torchigin. Enlarged shift of light frequency in a modified Bragg cell. *Pure and Applied Optics*, vol. 7, pp.763–782 (1998). Analysis shows that, usually, F≅50 MHz. As is discussed by Torchigin in the Russian patent, acoustic waves form open dielectric resonators not only in a glass focon with a circular cross section but also in structures with other cross sections, such as, for, example, pyramids with square or hexagonal bases.

Thus, in a glass focon, travelling acoustic waves form open dielectric resonators that move at the velocity of the acoustic wave. As an open dielectric resonator moves towards the narrow part of a focon its cross-section decreases and the light radiation contained within it is compressed. As a result, its energy and frequency increase.

Various explanations of these facts are as follows:

1. Light radiation exerts pressure on the conical sides of the resonator. As the cross section of the resonator decreases, mechanical work is required to overcome the pressure. This mechanical work is exactly equal to the increase in light radiation energy in the resonator.

2. As the conical surface of the resonator decreases, a Doppler effect develops with each reflection of a light wave from the moving decreasing surface. This results in an increase in the frequency of the reflected wave. As a consequence of repeated reflections the frequency of the light radiation can increase significantly.

3. The concurrent increase in energy and frequency of the light radiation stored in the resonator is easily explained. The total number of photons in the resonator is unchanged during the process of compression if dissipative losses are negligible. Since the total energy in the resonator increases, the energy of each photon also increases. Because E=hv, where E is the energy of a photon, and v is its frequency, an increase of E proportionally increases v.

4. In any resonator, the resonator mode of electromagnetic oscillations is preserved on slow (adiabatic) compression of the resonator. That is, the number of spatial variations of the electromagnetic field along co-ordinates of the resonator is unchanged. In this situation, if the diameter of the cross-section of the resonator decreases by K times then the wavelength of the "whispering gallery" type travelling wave also decreases by K times. And, it follows that the frequency of the light wave increases by K times. In accordance with Manley-Rowe relations, the energy of light radiation stored in the resonator increases proportionally to the increase of its frequency, i.e. by K times in the given situation. The index of frequency conversion is determined from the following simple relation.

$$D_1/D_2 = \lambda_1/\lambda_2, \quad (4)$$

where $D_1$ is the diameter of the cross-section at the point of input of light radiation, $D_2$ is the diameter of the cross-section at the point of output of that light radiation, $\lambda_1$ is the wavelength of the input light, $\lambda_2$ is the wavelength of the output or converted light. For, example, if $D_1/D_2=2$ then the frequency of the converted light increases by an octave, i.e. the second harmonic is obtained. In this case, where $D_1/D_2=2$, it follows that the frequency of the converted or output light is equal to two times the frequency of the input light.

5. The maximum energy density of light radiation in a focon does not coincide with the maximum acoustic pressure or the maximum refractive index. The maximum energy density is located to the left of the maximum acoustic pressure when the narrow part of the focon is located to the right. The maximum energy density is located in the region of the focon where the acoustic pressure is decreasing with time as the wave propagates towards the narrow end of the focon. On the other hand, it is known that, due to an electrostriction effect, a light wave generates a pressure in the medium where it propagates. Thus, the pressure of the light wave is increasing as the pressure of the acoustic wave is decreasing, i.e. the action of the acoustic wave is directed against the action of the light radiation. As a result, an interchange of the energies between the acoustic and light waves takes place. Acoustic wave energy is transferred into light wave energy.

6. When a WGM light beam propagates towards the tapered part of a focon its axial component decreases on each reflection from any side plane of the focon. As a result, the angle between the light beam and the axis of the focon increases. When the angle becomes equal to 90° the shift of the beam towards the narrow end of the focon terminates and the beam achieves a turning point. After the turning point, the beam propagates towards the wide part of the focon with a progressively increasing angle.

On the other hand, when an acoustic wave is propagated along the axis towards the narrow (tapered) end of the focon, a light wave reflected at a turning point propagates in the opposite direction, towards the base of the focon. The angle between the direction of the light beam and the axis decreases as the light beam travels towards the base. There is a point where the corresponding angle is such that the Bragg condition is valid. In this case, a light wave reflects from a so-called distributed Bragg reflector (DBR) formed by an acoustic wave and propagates in the direction of the taper (narrow part) of the focon. It is known that the frequency of a diffracted light wave, reflected from a moving DBR, increases by F, the frequency of the acoustic wave. A light wave that reaches the turning point reflects from it and propagates again to meet the DBR formed by the acoustic wave. Upon meeting the fragment of the acoustic wave that is its corresponding DBR, the light wave reflects from it again. As this takes place, the frequency of the light wave increases by F again and becomes equal to f+2F.

Thus, the frequency of the light wave increases by F on each reflection from the DBR but is unchanged on each reflection at the turning point. As a result of repeated reflections, the frequency of the light wave can increase significantly. In this case, the cascading multistage frequency conversion in the same device follows the scheme f→f+F→f+2F→ . . . →f+NF. Notably, there always exists at least one acoustic wave fragment that functions as a DBR for light waves having the appropriate frequency. At the same time, there are turning points for light waves of various frequencies. Therefore, the conditions necessary for repeated increasing of the light frequency on the repeated reflections from the DBR are satisfied for light waves with various frequencies. The light frequency in an ideal system without dissipative and radiative losses increase when the accepted assumptions are valid.

Thus, in this case (i.e. a focon) we have an open dielectric resonator in that the propagation of light radiation is confined along the axis by the turning point and the DBR, where the turning point is farther from the base of the focon than the DBR is from the base of the focon. As the frequency of the light wave increases, both the turning point and the DBR are shifted toward the tapered end of the focon. That is, the resonator moves towards the tapered end of the focon. Analysis shows that the velocity of the resonator movement equals the velocity of the acoustic wave.

From the foregoing considerations, one can conclude that the energy and frequency of the light radiation stored in the resonator change proportionally to one other. When loses in a resonator are negligible during compression of a light wave, the increase in energy and frequency is determined by the simple relation (4).

Thus, the peculiarities of the presented method of light conversion are the following.

1. Since the conversion of light radiation frequency occurs gradually as light is propagated along the axis of the focon, it is possible to obtain output radiation with various frequencies. In order to obtain light radiation outputs of more than one frequency, it is sufficient to place several coupling prisms along the side surface of the focon.

2. Several light signals with various frequencies can be amplified and converted simultaneously.

3. The wavelength range for input and output light radiation is broad and is limited only by light attenuation of the medium used in the focon.
4. The availability of types of glass with small losses for light and acoustic waves and with high resistance to intensive light and acoustic waves permit the creation of light amplifiers-converters and generators having small size, high efficiency, and large output power.
5. Components and materials used in the devices disclosed in this application are employed in modern acoustooptics and are commercially available.
6. The parameters of some types of available glass permit conversion and amplification in the wavelength range of one octave.
7. Amplification and conversion can be performed in a linear medium, for example, in the glass used for fabrication of fibers.
8. There are no critical parameters or sizes. That is, the device can consist of a tapered fiber having a small diameter or a glass body having a large diameter. Conversion can take place not only in any glass focon but also, as disclosed in this application, in any glass body having sufficiently good homogeneity wherein the condition σ<m is satisfied, Homogeneity is sufficiently good when deflections from the medium value of the refractive index are less than the index of modulation, that is, less than $10^{-4}$.

The device disclosed in Patent 2085984RU has certain drawbacks that are overcome by the invention presented in this disclosure. For example, relative to patent 2085984RU, the invention of the present disclosure increases the index of light frequency conversion and the efficiency of conversion. Furthermore, in the device disclosed in patent 2085984RU, the side surface of the device that forms the air-glass boundary from which the WGM is totally reflected degrades with time and the parameters of the device worsen.

Parametric Optical Devices

A parametric optical apparatus uses the mechanical energy of elastic oscillations to convert light over a wide range of wavelengths and amplitudes and to generate coherent light. The present invention relates to optical and acoustooptical devices and more particularly to parametric amplifiers, converters, and generators of light radiation. In certain applications, the apparatus is an alternative to the use of lasers and converters.

Each of the optical parametric devices presented in this invention take advantage of at least one of the peculiarities of wavelength conversion, amplification and generation of light waves that occur during the interaction between light and acoustic waves in a lightguide with a cross-section that varies along its axis. The wavelength conversion, amplification and generation of light waves disclosed in the present invention are not typical of the interaction between light and acoustic waves and were not expected prior to the experiments of the inventor.

An object of the present invention is to provide a parametric optical apparatus with acoustic pump wherein relatively cheap energy of elastic oscillations is transformed into energy of coherent light in a broad range of light wavelengths and powers.

Another object of the present invention is to provide a parametric optical apparatus with acoustic pump that is useful in various specific fields of applications.

A specific object of the present invention is to improve the efficiency and operating characteristics of the prior-art amplifier-converters of light radiation.

A further object of the present invention is to provide a parametric generator of coherent light based on said parametric optical apparatus wherein coherent light is obtained from the energy of an acoustic pump without any additional sources of light. When dissipate losses from the glass are small, a broad range of wavelengths and power of output light radiation can be obtained.

The present invention provides a first parametric optical apparatus with acoustic pump wherein a glass body of rotation is used in which the refraction index in the cross section of the body decreases as the distance from the axis increases. This decreases losses of light radiation due to the scattering of light by various imperfections on the conical side surface of the body of rotation.

The present invention provides a second parametric optical apparatus with acoustic pump wherein the length of said body of rotation is extended to function as a matching load for the acoustic wave. This simplifies fabrication of the body and improves the quality of matching.

The present invention further provides a third parametric optical apparatus with acoustic pump wherein the acoustic transducer is fabricated from piezoceramic. An acoustic wave is excited by single acoustic pulses with a low frequency of repetition. This decreases the total power of the source for exciting the acoustic wave.

The present invention still further provides a fourth parametric optical apparatus with acoustic pump wherein a series of acoustic pulses is used instead of a single acoustic pulse to increase the efficiency of conversion by means of decreasing the length of the focon.

The present invention provides a fifth parametric optical apparatus with acoustic pump wherein a series of pulses with gradually increasing frequency is used to excite an acoustic wave.

The present invention further provides a sixth parametric optical apparatus with acoustic pump wherein the frequency of output light radiation depends on the power of the acoustic wave, that is, the frequency of the output light radiation can be changed by changing the electrical power exciting the acoustic transducer. This provides a means for a rapid (electronic speed) change of frequency of the output light radiation.

The present invention still further provides a seventh parametric optical apparatus with acoustic pump wherein the amplification and frequency conversion of non-coherent light radiation with various wavelengths can be performed simultaneously. This simplifies the input of light radiation.

The present invention still further provides an eighth parametric optical apparatus with acoustic pump wherein a surface acoustic wave is excited in said body. This decreases the acoustic power required.

The present invention still further provides a ninth parametric optical apparatus with acoustic pump wherein specific coupling devices in the form of focons are used. This permits the index of coupling to be adjusted without any mechanical shifts of the coupling devices.

The present invention still further provides a tenth parametric optical apparatus with acoustic pump without an acoustic transducer for some applications. This significantly simplifies the apparatus.

The present invention still further provides an eleventh parametric optical apparatus with acoustic pump wherein the wavelength of the output radiation is changed by means of changing the power of the input radiation. This enables one to change (or control) the output light wavelength with a change of input light power.

The present invention still further provides a twelfth parametric optical apparatus with acoustic pump wherein a glass cone with a barrel-shaped segment is used. This is useful in some applications as the input of light radiation is simplified.

The present invention still further provides a thirteenth parametric optical apparatus with acoustic pump wherein a conical glass capillary tube is used as the body in which the interaction between acoustic and light waves takes place and in which an azimuth independent acoustic Lamb wave with one variation of pressure along the radius is excited (instead of a plane longitudinal acoustic wave) in the body. This increases the phase velocity of the acoustic wave and thereby decreases the time of conversion and, therefore, increases the efficiency of conversion.

The present invention still further provides a fourteenth parametric optical apparatus with acoustic pump wherein a conical capillary tube with variable thickness of its walls is used. This increases the efficiency of conversion.

The present invention still further provides a fifteenth parametric optical apparatus with acoustic pump wherein a glass cone with homogeneous refraction index is used instead of an inhomogeneous glass cone. In this case, the losses of conversion increase but problems of input/output light radiation in/out of the cone are simplified.

The present invention still further provides a sixteenth parametric optical apparatus with acoustic pump wherein a lightguide with a regular polygon or rectangular cross section is used instead of a circular cross-section. This further simplifies the problems related to the input and output of light radiation into and out of the lightguide.

The present invention still further provides a seventeenth parametric optical apparatus that uses a coherent light generator based on the energy of the acoustic wave in conjunction with other selected apparatuses of this invention. A feedback loop comprising a light frequency divider on the base of a nonlinear crystal is introduced for this purpose. The divider divides the light frequency by two.

The present invention provides an eighteenth parametric optical apparatus with acoustic pump wherein the first to seventeenth apparatuses disclosed provide a generator of coherent light with various wavelengths that can be used for forming WDM signals. Several output coupling devices are located along the lightguide for this purpose.

The present invention provides a nineteenth parametric optical apparatus with acoustic pump wherein a glass coating is used in which the refraction index of the glass coating is less than the refrection index of the glass body. This decreases losses of light radiation due to the scattering of light by various imperfections on the conical side surface of the body.

Acouto-Optical Applications

The present invention relates to acousto-optic devices, and particularly to acousto-optic devices with a response time of about several microseconds, such as switches, modulators of light radiation, acousto-optic tuneable filters, deflectors and light beam scanners. These devices take advantage of parametric optical apparatuses that use the mechanical energy of elastic oscillations to convert light over a wide range of wavelengths and amplitudes and to generate coherent light.

A primary objective of the present invention is to provide an apparatus based on an acousto-optic cell with variable cross-section that functions as a gate of light radiation controlled by an acoustic wave. Another object of the present invention is to provide an acousto-optic tuneable filter that can be useful in various specific fields of applications. Both devices have a similar design and are based on the same physical effects. A further object of the present invention is to provide an apparatus based on an acousto-optic cell with variable cross-section for the deflection of a light beam and for scanning. Another object of the present invention is to provide an apparatus based on an acousto optic cell with variable cross-section for coupling controlled by the acoustic wave between input and output ports. In particular when the ports are fibers.

The present invention provides a first acousto-optic apparatus wherein a gate of light radiation controlled by an acoustic wave is realised. The acoustic wave reflects the light wave propagated in the waveguide with variable cross-section. The reflected light wave is used as an output signal of the gate. The gate operates with light waves of various polarisations and wavelengths.

The present invention provides a second acousto-optic apparatus wherein a light radiation switch is controlled by an acoustic wave. In the absence of an acoustic wave, an input light wave propagates from an input port to an output port. When an acoustic wave is present, the acoustic wave reflects the light wave that propagates from an input port to an output port. The switch can operate with light waves of various polarisations and wavelengths.

The present invention provides a third acousto-optic apparatus wherein the wide face or base of the AO cell is partially free of an acoustic transducer and the cell is used as a reflector. The presence of an acoustic wave in the AO cell changes the properties of the reflector, in particular, the angle of reflection. This property is used for deflection, scanning, and switching light beams.

The present invention provides a fourth acousto-optic apparatus wherein the AO cell has a segment with minimal diameter. An output coupling device is placed after the segment. In an AO cell, an acoustic wave forms a distributed Bragg reflector that reflects light waves with wavelengths less than a certain boundary of frequencies. A change of the frequency of the acoustic wave changes the boundary. This effect is used in acousto optic tuneable filters (AOTF) to control the light wavelengths with the frequency of the acoustic wave.

The present invention provides a fifth acousto-optic apparatus that features the connecting of an AO cell with a waveguide. The small cross-section of an AO cell permits the direct coupling of a fiber device with the AO cell. Such coupling devices use common evanescent fields for coupling. These fiber, waveguide-like, coupling devices simplify coupling relative to the use of lens or prism coupling devices.

The present invention provides a sixth acousto-optic apparatus wherein a surface azimuth-independent acoustic wave, instead of a volume acoustic wave, is excited on the side surface of the AO cell. Use of a surface wave decreases the power of the acoustic wave required.

The present invention provides a seventh acousto-optic apparatus wherein a matching load for the acoustic wave is excluded to simplify fabrication of the AO cell. The acoustic wave attenuates in the additional segment of the lengthened AO cell. The AO cell is fabricated with the same technology that is used for fabrication of glass fibers and, therefore, the additional region of the AO cell can be fabricated without noticeable additional effort.

The present invention provides an eighth acousto-optic apparatus wherein a conical capillary tube is used as the waveguide. Since the area of the cross-section of a capillary tube is less than the area of an analogous cross-section of a solid or continuous cone, the use of a capillary tube decreases the power of the acoustic wave required and increases the efficiency of the interaction between the acoustic and light waves due to an increase of their overlapping.

The present invention provides a ninth acousto-optic apparatus wherein an azimuth-independent symmetrical acoustic Lamb wave with one variation of pressure along the radius of a conical capillary tube is excited instead of a plane longitudinal acoustic wave. This increases the index of modulation of the refractive index without increasing the power of the acoustic wave and consequently decreases the power of the acoustic wave required.

The present invention provides a tenth acousto-optic apparatus wherein the refraction index of the core of the waveguide is greater than the refractive index of the coating of the waveguide. This decreases losses of the light wave due to defects and imperfections on the side surface of the waveguide.

The present invention provides an eleventh acousto-optic apparatus wherein the cross section of the waveguide has the form of a regular polygon or rectangle. This enables the use of an AO cell with a traditional cross section in applications where such form is preferable.

BRIEF DESCRIPTION OF THE DRAWINGS

The invention will be explained in more detail in conjunction with appended drawings wherein.

FIG. 10 illustrates an embodiment of an acouto-optic cell of the invention with fiber coupling devices.

FIG. 11a illustrates the dependence of pressure P in a symmetrical Lamb wave on the radius r in a conical capillary tube.

FIG. 11b illustrates the dependence of pressure P in a symmetrical Lamb wave on the azimuth $\phi$ in a conical capillary tube.

DESCRIPTION OF THE PREFERRED EMBODIMENTS

The preferred embodiments will be best understood by referring to the figures.

Figure 1:
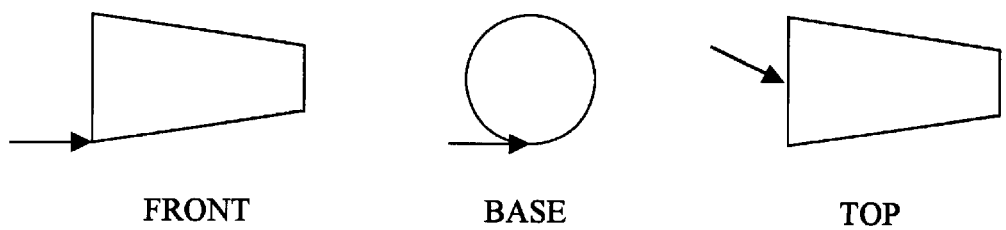
FIG. 1 illustrates the trajectory of a beam of light entering a focon.

FIG. 1 illustrates the trajectory of an input beam of light entering a focon through the wide end or base of a focon.

Figure 2:
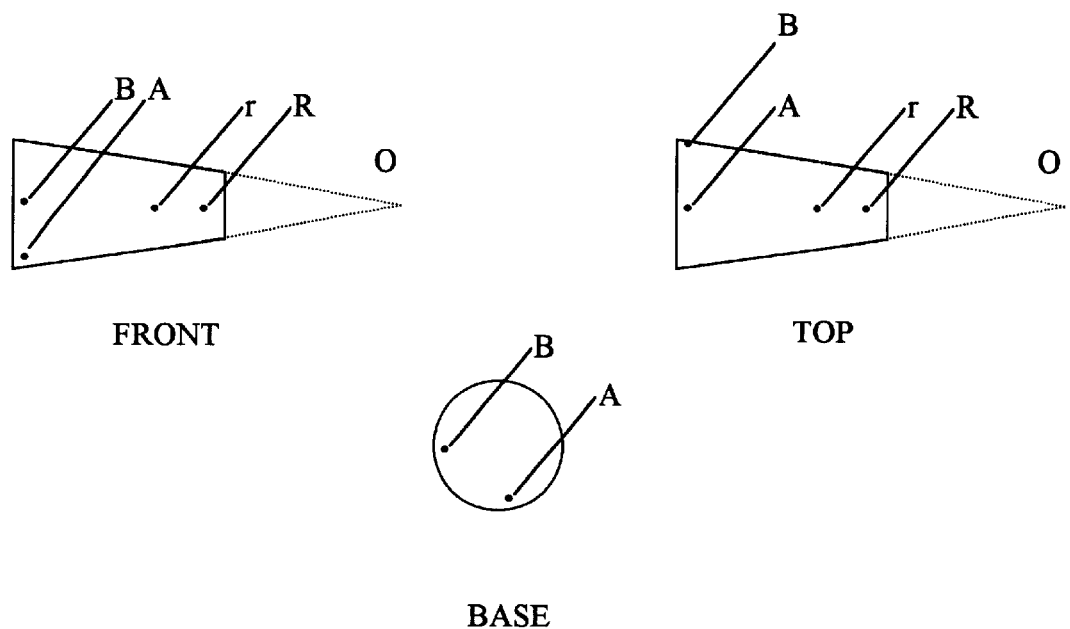
FIG. 2 illustrates the effect of introducing an acoustic wave into the focon of FIG. 1.

FIG. 2 illustrates the effect of introducing an acoustic wave into the focon illustrated in FIG. 1. The focon illustrated in FIG. 2 is a truncated cone. The vertex of the cone is the point O. A light beam entering through the base of a focon, strikes the side surface of the focon at a point A (the entry point) near the base. In the absence of an acoustic wave, a whispering gallery mode light wave spirals down the focon to a point R, where R is the maximal point of penetration of the light wave. The point R is also the return point of the lightwave. That is, upon reaching the point R, the light wave reverses direction and exits the focon through the base. Point B (the exit point) is the last point on the side surface of the focon that the light wave strikes before exiting the focon. A change in the angle of incidence of an input light beam at a given entry point, changes the position of the exit point.

Furthermore, the introduction of an acoustic wave into the focon creates a DBR-like structure. Under the proper conditions, a light wave travelling in the focon can reflect off the DBR-like structure created by the acoustic wave. The interaction of the light wave and the acoustic wave can result in a shift in the return point. For example, in FIG. 2, the return point of the light wave shifts from the point R to the point r.

Figure 3:
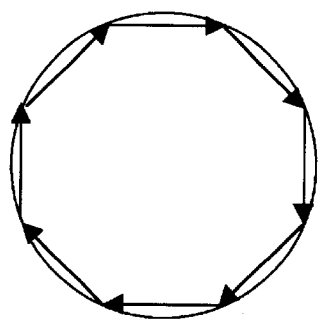
FIG. 3 illustrates the trajectory of a "whispering gallery" mode light wave in a cross-section of a body of rotation waveguide.

FIG. 3 illustrates the cross section of a body of rotation, such as a focon, viewed from an end. The side surface of the body of rotation in the cross section illustrated in FIG. 3 provides total internal reflection of a light wave striking the side surface. For example, in the case of a whispering gallery mode light wave, the light wave is confined by the side surface of the cross section. The exact shape of the side surface of the cross section determines the axial movement of the light wave. For example, in a slowly tapering waveguide, such as a focon, a light wave introduced through the base of the focon spirals gradually towards the narrow end of the focon. In FIG. 3, the trajectory of such a light wave appears circular.

A common preference in all of the preferred embodiments is that the waveguide mode of the light waves entering the device is of the whispering gallery type.

First and Second Preferred Embodiments

Figure 4:
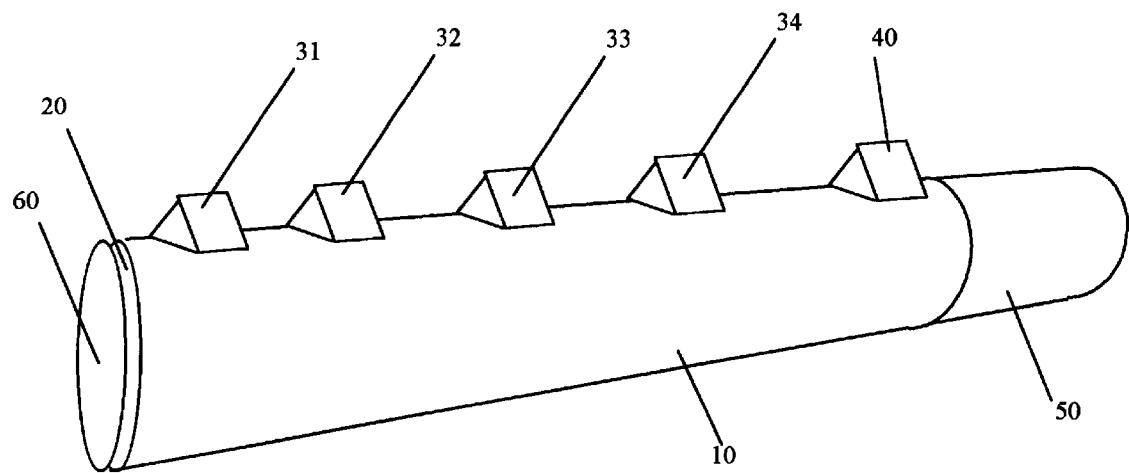
FIG. 4 illustrates an embodiment of an acousto-optic gate of the invention.
Figure 5:
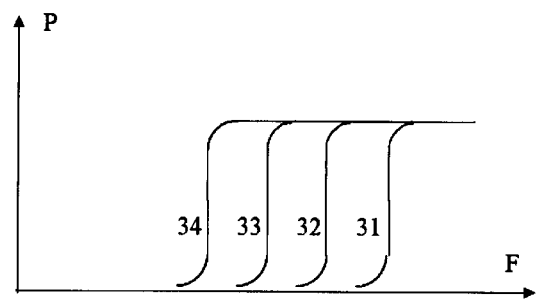
FIG. 5 illustrates the dependence of light power at the output ports of the device of FIG. 4 on the frequency of an acoustic wave.

In FIG. 4, the focon illustrated comprises body 10, input coupling device 40, output coupling devices 31, 32, 33, and 34, base 20, and matching load 50. An acoustic transducer 60 is attached to base 20. The illustrated device is a light radiation gate in which the light output of the output coupling devices is controlled by an acoustic wave. In the absence of an acoustic wave in the focon, a light wave entering the focon through input coupling device 40 propagates towards the base of the focon and travels to all output coupling devices 31, 32, 33, and 34. Matching load 50, attached to the tapered end of the focon, is designed for absorption of an acoustic wave to provide a travelling acoustic wave in the focon. If a DBR formed by an acoustic wave resides between coupling devices 40 and 34, the light wave cannot travel to any of the output coupling devices. If a DBR resides between coupling devices 34 and 33, the light wave can travel to coupling device 34 but cannot travel to coupling devices 31, 32, and 33. The location of the DBR is controlled by the frequency of the acoustic wave. More precisely, the location of the DBR depends on the propagation constant of the acoustic wave that, in turn, depends on the frequency of the acoustic wave. Thus, changing the frequency of the acoustic wave changes the location of the DBR. Coupling devices residing to the left of a DBR are not accessible to light radiation. Thus, changing the DBR location controls the transmission of light to the coupling devices. That is, we have a light radiation switch controlled by the frequency of an acoustic wave. FIG. 5 illustrates the dependence of power output on the frequency of the acoustic wave for the output coupling devices of FIG. 4.

Furthermore, the gate can be controlled by the power of the acoustic wave rather than by its frequency. More precisely, increasing the power increases the width of the DBR. In this case, the right side of the DBR (that is, the side closest to the tapered end of the focon) moves to the right and prohibits access of light to some coupling devices.

In particular, the switch operates as a typical optical gate controlled by an acoustic wave. Consider the case when only one output coupling device (34) is used. Since the propagation constant of a light wave increases as it propagates into the wide part of a waveguide and the propagation constant of an acoustic wave does not change along the waveguide, there is always a segment of the waveguide in which the Bragg condition is satisfied. And, therefore, there is always a DBR for a light wave of any wavelength. That is, a single acoustic wave can form one or more DBRs for light waves with various wavelengths. Thus, an optical gate, created by a single acoustic wave, simultaneously operates with light waves of various wavelengths, that is, unlike the typical prior art AO cell, the gate disclosed in this invention is wavelength independent.

As is known, the operation of the typical prior art AO cell also depends on the polarisation of the input light. This is understandable because the interaction between the light and acoustic waves depends on the relation between the direction of the vector of electric field strength E of the light wave and the direction of propagation of the acoustic wave. When both directions are similar the interaction is characterised by the dimensionless photo-elastic coefficient $p_{11} \cong 0.12$. When these directions are perpendicular the interaction is characterised by the dimensionless photo-elastic coefficient $p_{12} \cong 0.27$. This also holds for the interaction between light and acoustic waves in a waveguide. However, in a waveguide, a DBR formed by an acoustic wave can have very high reflectivity for both types of interactions. For example, the index of reflection for the interaction with $p_{11}$ is $\Gamma=0.99$ and for the interaction with $P_{12}$ is $\Gamma=0.9999$. The dissimilarity is not significant for operating a gate. Thus, unlike a typical prior art AO cell, the gate is both wavelength independent and polarisation independent.

Figure 6:
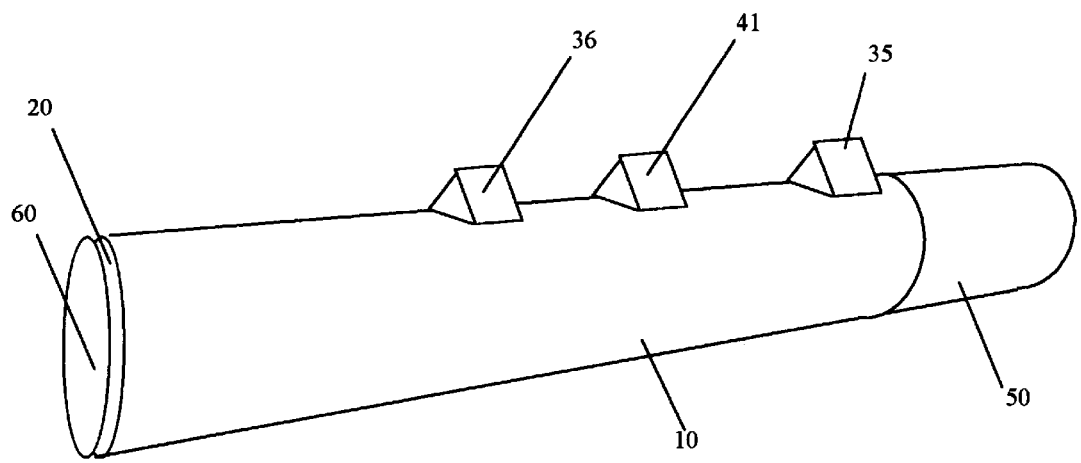
FIG. 6 illustrates an embodiment of an acousto-optic switch of the invention.

In FIG. 6, the focon illustrated comprises body 10, input coupling device 41, output coupling devices 35 and 36, base 20, and matching load 50. FIG. 6 illustrates a light radiation switch in which the light output through coupling devices 35 and 36 is controlled by an acoustic wave. In the absence of an acoustic wave, a light wave entering through input coupling device 41 propagates into the wide part of the focon and travels to output coupling device 36. If an acoustic wave is present and the DBR formed by the acoustic wave resides between coupling devices 41 and 36, the light wave cannot travel to coupling device 36 because it reflects from the DBR. However, in this case, the light wave can travel to output coupling device 35. Thus, we have a switch that switches light radiation from output coupling device 36 to output coupling device 35 when the acoustic wave is turned on.

Third Preferred Embodiment

Figure 7:
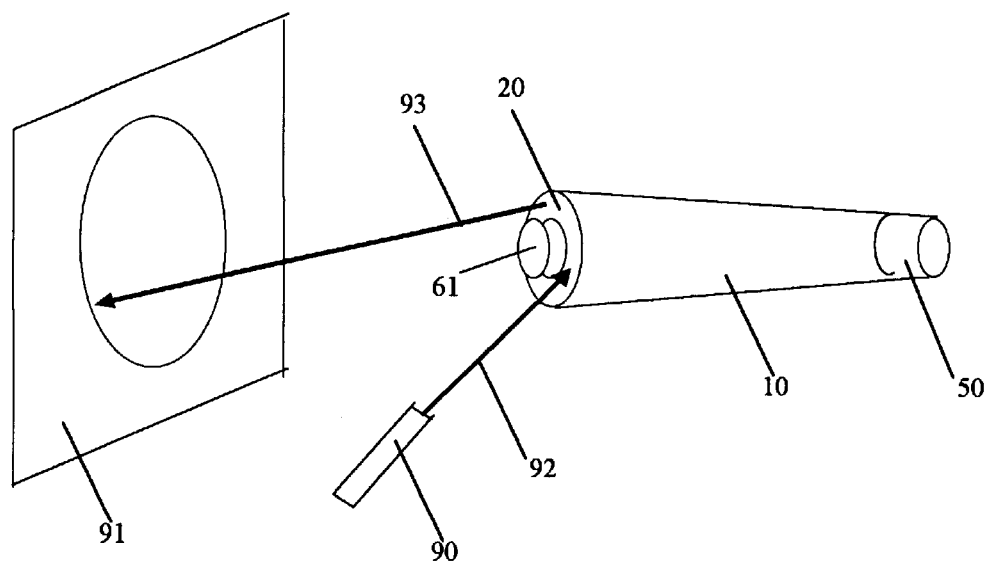
FIG. 7 illustrates an embodiment of an acousto-optic deflector of the invention.

FIG. 7 illustrates an AO cell, in this case a focon, that comprises body 10 and matching load 50. FIG. 7 illustrates a screen 91 with a central circle of light resulting from an output light beam 93 reflected off the base 20 of the focon. Input light beam 92 is generated by light beam source 90.

FIG. 7 shows the deflection of a light beam on base 20 of an AO cell with variable cross-section along its axis. The part of the base of the AO cell that is free of acoustic transducer 61 is used as a reflector whose properties are controlled by the acoustic wave. The exit point and direction of the reflected beam depends on the parameters of the acoustic wave excited by transducer 61. In the absence of an acoustic wave, a light beam reflected from the base of an AO cell strikes a point on screen 91. However, if an acoustic wave is present, that same light beam can be deflected by the acoustic wave to cause it to exit the base at a different location and to strike the screen at a different point. The angle of incidence of the input light beam is chosen so that a return point exists somewhere within the AO cell. A change of the frequency of the acoustic wave changes the position of the DBR formed by the acoustic wave. Changes in the power of the acoustic wave changes the width of the DBR formed by the acoustic wave. As a result, the trajectory of the light beam reflected from the DBR is changed and the exit point of the reflected beam changes its position on the base of the AO cell. In FIG. 7, as the exit point moves along a circle on the base, a circle is drawn on the screen by the reflected beam. Thus, the addition of means to vary the frequency or power of the acoustic wave turns an AO cell into a deflector.

One versed in the art will recognize that a deflector can be transformed into a modulator of light radiation or a light scanner.

Fourth Preferred Embodiment

Figure 8:
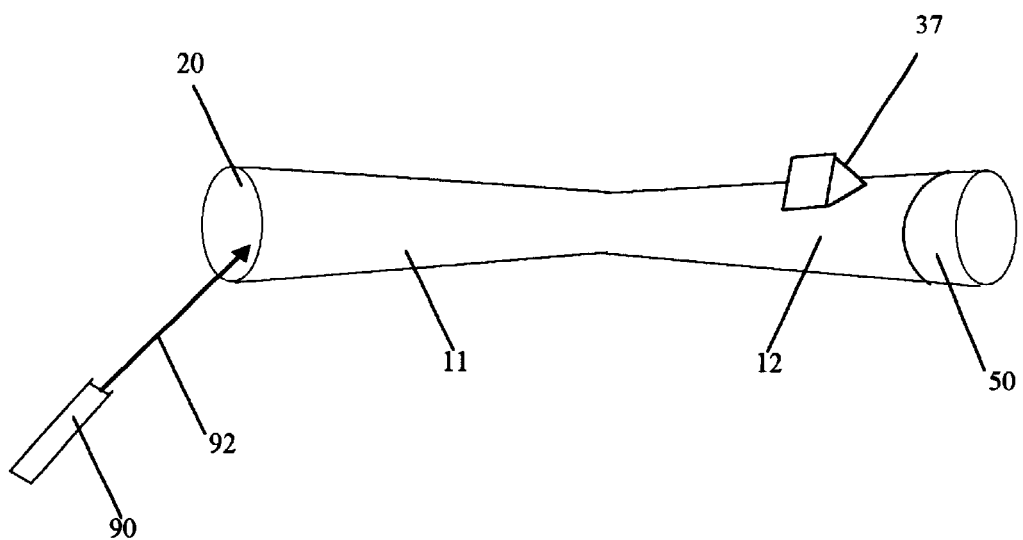
FIG. 8 illustrates an embodiment of an acousto-optic tuneable filter of the invention.

FIG. 8 illustrates an acousto optic tuneable filter (AOTF) controlled by the frequency of an acoustic wave. The AOTF comprises a wave guide that has a first segment 11 and a second segment 12. The AOTF also comprises a base 20, an output coupling prism 37 and a matching load 50. Comparing the AOTF illustrated in FIG. 8 to the deflector illustrated in FIG. 7, one should note the presence of a second segment (12) of the waveguide. The first segment of the waveguide has a decreasing cross-section and the second segment has an increasing cross section. A light wave travelling in the second segment can be used as an output signal that exits the device at output coupling prism 37.

Figure 9A:
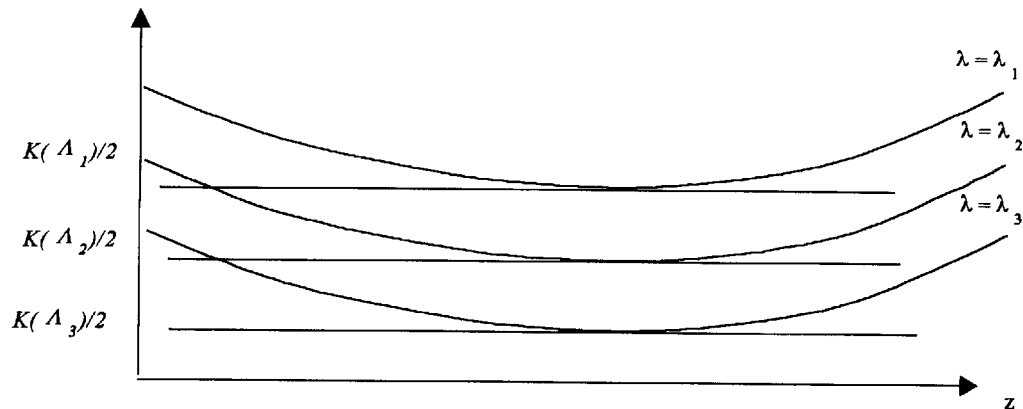
FIG. 9a illustrates the dependence of the propagation constant $k_=$ of a light wave in a waveguide with variable cross-section on the position of the light wave along the z-axis of an acousto-optic tuneable filter of the invention when a light wave enters through the base of the cell.

In the AOTF of FIG. 8, a light beam that enters the device through the base is able to penetrate through the narrow part of the waveguide if the condition $k_\perp < k$ is valid, where $k_\perp$ is the component of the wavevector in the plane perpendicular to the axis of the waveguide in the most narrow part of the waveguide. Since $k_\perp(0) = k \sin\theta$ where $\theta$ is the angle of incidence of the light beam on the wide face or base of the AO cell at $z=0$, the value of $k_\perp$ at any point $z=z_0$ is determined in accordance with equation (431 i) as follows $k_\perp(z_0) = k \sin\theta D(0)/D(z_0)$. The condition $k_\perp < k$ does not depend on the wavelength $\lambda$. However, in accordance with equation (4-i), $k_=(z) = k(\lambda)\{1-(\sin\theta\ D(0)/D(z))^2\}^{1/2}$, the propagation constant of the light wave is proportional to $k(\lambda)$ or $1/\lambda$. In the present case, the dependence of propagation constant $k_=$ on z is shown in FIG. 9a for light beams with various wavelengths $\lambda_1 < \lambda_2 < \lambda_3$ when a light wave enters through the base of the cell. The straight horizontal lines correspond to half of the propagation constants of the acoustic waves with various wavelengths $\Lambda_1 < \Lambda_2 < \Lambda_3$. The points of intersection of the horizontal lines with the curves $k_=(z)$ correspond to the locations of the DBR formed by the acoustic wave.

As is seen from FIG. 9a, if the wavelength of an acoustic wave $\Lambda = \Lambda_2$ the curves for the propagation constants for the light waves with wavelengths $\lambda < \lambda_2$ are located above the horizontal line $K = K(\Lambda_2)/2$. As a result, the light waves penetrate through the narrow segment and can be used as output signals. Thus, the device is a high frequency filter.

Changing $\Lambda$ of the acoustic wave changes the wavelength boundary of the filter. If the wave reflected from the DBR formed by the acoustic wave is used as an output signal we have a low frequency filter. As usual, band pass and gap pass filters can be obtained by combinations of these types of filters.

Figure 9B:
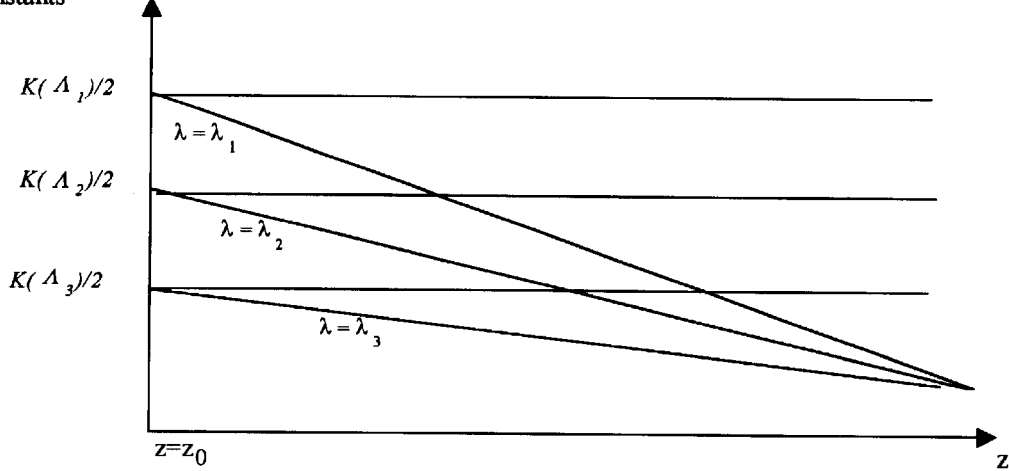
FIG. 9b illustrates the dependence of the propagation constant $k_=$ of a light wave in a waveguide with variable cross-section on the position of the light wave along the z-axis of an acousto-optic tuneable filter of the invention when a light wave enters through the side of the cell.

Input light radiation can be introduced in the AOTF not only through either end of the waveguide but also through its side surface. It follows that an optical switch, such as those illustrated in FIGS. 4 and 6, also can be used as an AOTF. The dependence of propagation constant $k_=$ on the position of the light wave along the z-axis of the AO cell is shown in FIG. 9b for light beams with various wavelengths $\lambda_1 < \lambda_2 < \lambda_3$ when a light wave enters through the side of the cell. There exists at least one point z' where a light wave entering through a side surface input coupling device has no axial component, i.e. $k_=(z') = 0$. This condition is valid for any wavelength. The horizontal straight lines show dependencies of halves, that is $K(\Lambda_1)/2$, $K(\Lambda_2)/2$, $K(\Lambda_3)/2$, of the propagation constants on z, where $K(\Lambda)/2$ is half of the propagation constant of the acoustic wave with wavelength $\Lambda$. The point $z_0$ corresponds to the location of the output coupling device. One can see that the acoustic wave with $K(\Lambda_2)$ reflects light waves with wavelengths $\lambda < \lambda_2$, i.e. the switch can be used as a filter for low frequencies. This is easy to understand because, in accordance with its definition, an AOTF can be used as a switch. It can pass light signals with certain wavelengths in one case and reject the same light signal in another case depending on how it is tuned.

Fifth Preferred Embodiment

Unlike typical prior art AO cells in which a light wave propagates in free space and is not confined by the AO cell, in AO cells with variable cross-sections a light wave propagates in a waveguide that confines it in two dimensions.

In actual fact, with respect to the acoustic and light waves, the AO cell is a one dimensional device. This permits the use of optical fiber input and output ports in the design of small-sized AO cells. The light wave in the AO cell has a "whispering gallery" type waveguide mode that can be thought of as a travelling wave rotating around the axis of the AO cell. This type of wave looks like a light wave in a single mode fiber ring. This enables one to obtain a simple design for coupling the AO cell with an optic fiber.

FIG. 10 illustrates the use of fiberoptic coupling devices 38 and 43 with an AO cell rather than the optical prisms used in FIGS. 4, 6 and 8. The side surface of the fiber is polished partially to increase evanescent fields of the fiber. The polished part of the side surface of the fiber is attached to the side surface of the AO cell. A similar approach is used for coupling between two fibers where one of them has no face such as those disclosed in U.S. Pat. Nos. 4,898,444 issued to Grimes et. al.; U.S. Pat. No. 4,768,854 issued to Campbel et. al.; U.S. Pat. No. 4,889,403 issued to Zucker et. al.; and U.S. Pat. No. 4,983,007 issued to James et. al.

Refraction index $n_{cell}$ of the optical medium from which the AO cell is fabricated must be a little greater than the refractive index of the fiber. The greater $n_{cell}$, the deeper is the penetration of the light field in the cell. As a result, as illustrated in FIG. 10, one can obtain a small-sized AO cell that has fiber inputs and outputs and that can perform the functions of switching, modulating, and tuneable filtering of light signals.

Various modifications of these devices are possible.

Sixth Preferred Embodiment

An azimuth-independent surface acoustic wave (SAW), instead of a volume acoustic wave with longitudinal oscillations, can be excited on the side surface of an AO cell. This decreases the power of the acoustic wave required. SAWs are used widely in many acousto-optic devices for this reason.

Seventh Preferred Embodiment

A matching load can be replaced by an additional segment of the waveguide, where the acoustic wave attenuates to a necessary degree. That is, the waveguide can be elongated and the matching load eliminated.

Eighth Preferred Embodiment

It is possible to place a central hole in the waveguide. In this case, the power of the acoustic wave can be decreased because the area of the cross-section is less than in the comparable continuous waveguide. The diameter of the central hole, or hollow core, is arbitrary and may vary along the length of the focon provided that any change in the diameter along the length of the focon is gradual. The diameter of the central core can be truncated or can taper to zero. That is, the central hollow core need not extend the entire length of the focon.

Ninth Preferred Embodiment

Figure 12:
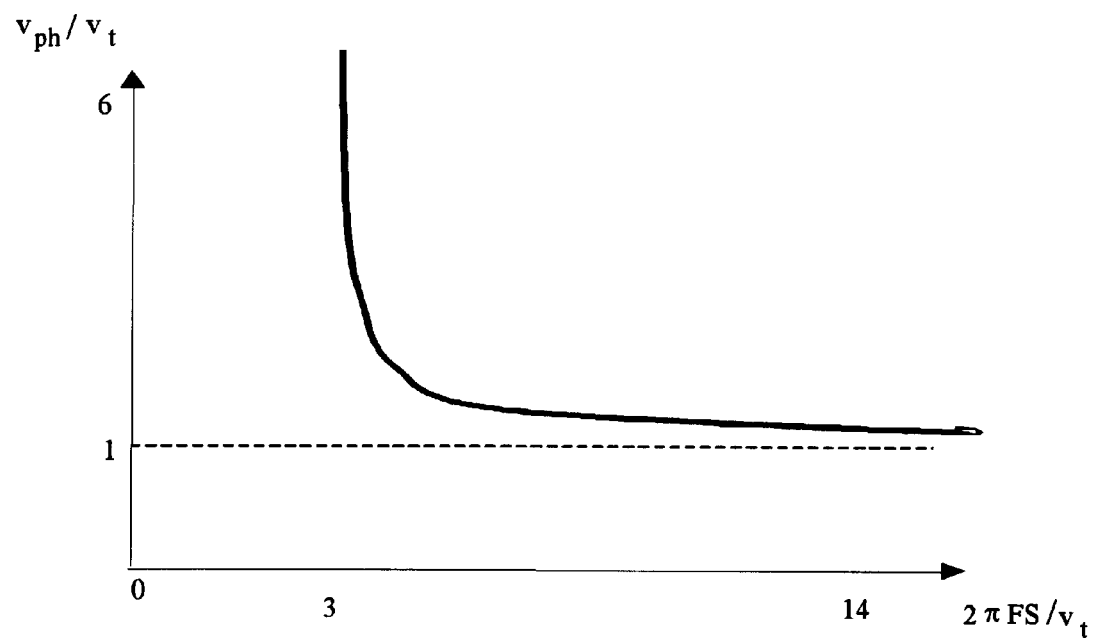
FIG. 12 illustrates the dependence of phase velocity $v_p$ on the frequency of a Lamb wave with one variation of pressure along the radius of a conical capillary tube on the thickness S of the tube.

When an azimuth-independent symmetrical acoustic Lamb wave with one variation of pressure along the ring radius of a conical capillary tube is excited instead of a plane longitudinal acoustic wave, a phase velocity that is significantly greater than the velocity $v_a$ of the acoustic wave in solid state may be obtained. The dependence of the pressure P in a symmetrical Lamb wave on the radius r in a conical capillary tube is illustrated in FIG. 11a. And, the dependence of the pressure P in a symmetrical Lamb wave on the azimuth φ in a conical capillary tube is illustrated in FIG. 11b. A conical capillary tube can be imagined as a part of a planar sound-guide with thickness S that is rolled up into a conical capillary tube with wall thickness equal to S. As is known, Lamb waves in a planar sound-guide with one or several variations of pressure along the width of the sound-guide have cut-off frequencies, i. e. these types of waveguide modes with frequencies F<$F_c$ can not propagate in a sound-guide. For example, the dependence of phase velocity $V_p$ on the frequency of a Lamb wave with one variation of pressure along the radius is shown in FIG. 12. Here $V_t$ is the velocity of a transverse acoustic wave in a bulk medium, S is the thickness of the sound-guide, F is the frequency of the Lamb wave. One can see that a wave with F≅$3V_t/(2πS)$ theoretically has an infinite phase velocity. In this case there is resonance along the thickness of the capillary tube.

It should be noted that the group velocity $v_g$ of an acoustic wave in a waveguide is inversely proportional to its phase velocity $v_p$. In this case, the velocity of propagation of acoustic energy $v_p$ decreases by the factor $v_a/v_p$. Therefore, if the power of the acoustic wave is constant (the flow of acoustic energy along the waveguide is constant), the density of energy of an acoustic Lamb wave in a waveguide increases by a factor of $v_a/v_p$. This increases the index of modulation m by a factor of $(v_a/v_p)^{1/2}$. In other words, to obtain the same indexes of modulation, the power required for an acoustic Lamb wave is $v_a/v_p$ times the power of a typical longitudinal acoustic wave whose group velocity $v_a$ equals the velocity of an acoustic wave in a bulk medium. Because the area of the cross-section of a capillary tube is less than the area of a cross-section of a solid focon with the same diameter, the intensity of the acoustic wave in the focon is less than the intensity in the capillary tube, all other things being the same.

Tenth Preferred Embodiment

A waveguide with an inhomogeneous refractive index in its cross section can be used. Consider the case where a waveguide has a coating that has a decreased refractive index relative to the remainder of the waveguide. Such waveguides enable one to remove light radiation from the surface of the waveguide and consequently to decrease light losses due to various defects and imperfections on the side surface of the waveguide.

Eleventh Preferred Embodiment

Figure 13:
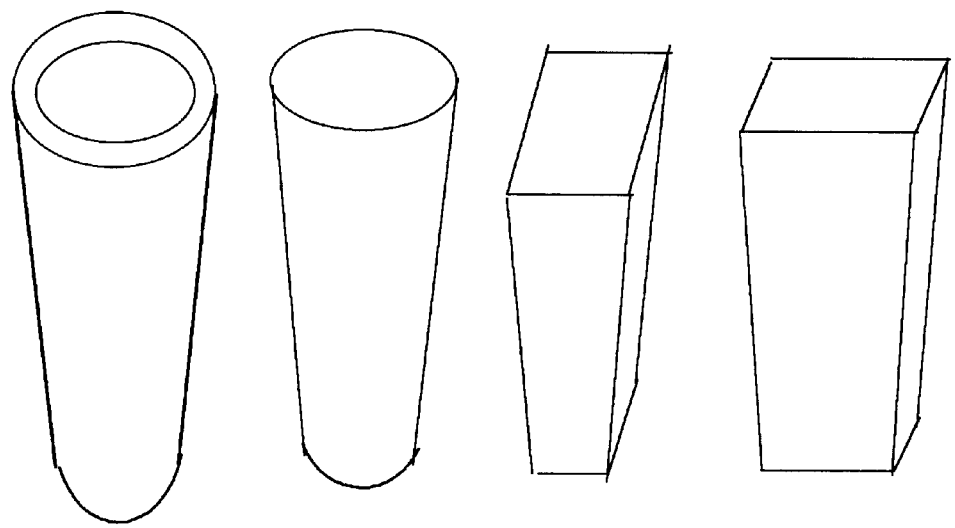
FIG. 13 illustrates some of the possible shapes of an AO cell with variable cross section of the invention.

It is possible to have a waveguide with a cross-section in the form of a regular polygon or rectangle. The light beam reflects from the side surface of the waveguide due to the same phenomenon of total reflection as in the focon. For the sake of illustration some forms of waveguides are presented in FIG. 13.

Twelfth Preferred Embodiment

The twelfth preferred embodiment of the invention comprises a glass body and an acoustic pump, wherein the refraction index n of a point on a cross-section of the body depends on the distance from said point to the axis of said body. Preferably, the glass body is a body of rotation. Preferably, the refraction index n in a cross-section that is perpendicular to the axis of the body decreases as the distance from the axis increases. This shifts the light field maximums towards the centre, or axis, of the body and thus decreases light radiation losses during amplification-conversion due to various imperfections on the side surface of the glass body.

Figure 14:
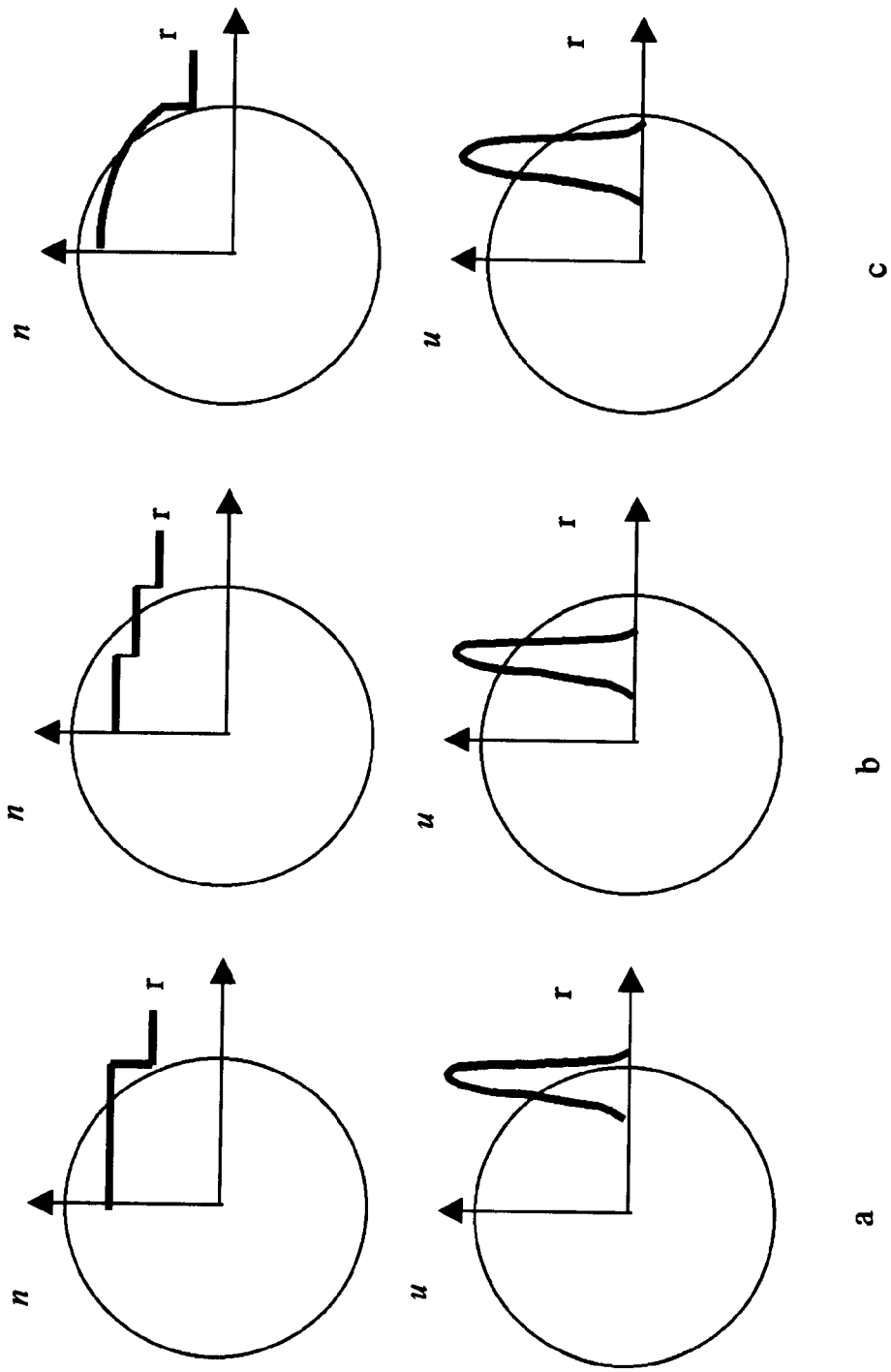
FIG. 14 compares dependencies of refraction index n and light field u on radius in a cross-section of a homogeneous cone (FIG. 14a), an inhomogeneous cone with step change of refractive index n (FIG. 14b), and an inhomogeneous cone with gradient change of refractive index n (FIG. 14c).

FIG. 14 shows the interdependence of the refractive index n and the light field u of a "whispering gallery" type light wave on the distance from the axis in three distinct cases: a) where the refraction index n is homogeneous in the cross section, b) where there is a step increase of the refraction index n in the cross section, c) where there is a gradual increase of the refraction index n in the cross section.

FIG. 14a illustrates that, when the refraction index n is homogeneous in cross section, the light intensity is concentrated in the vicinity of the glass-air boundary. Thus, any imperfection on the side surface of a cone results in a scattering of a light wave and a consequent increase of radiative losses. FIG. 14b illustrates that the light intensity concentrates in the coating in the vicinity of the coating-core boundary, where the core has a refraction index $n_{c0}$ and the coating has refraction index $n_{c1}$, and $n_{c1}$<$n_{c0}$. This results is a cross section in which there is a step down of the refraction index from the core to the coating. The light intensity on the glass-air boundary is small. In this case, radiative losses of light radiation due to the scattering of light by imperfections on the side surface of the focon are also small. The case shown in FIG. 14c corresponds to an intermediate situation. One should note that a similar approach is used in glass fibers to decrease the attenuation of light signals over distance. However, in the case presented in FIG. 14, a "whispering gallery" lightguide mode is used instead of the conventional modes that are used in fibers.

Unlike typical waveguide modes that are used in conventional fibers, any "whispering gallery" mode has radiative losses that differ theoretically from 0 and means are required to limit these losses to acceptable levels. Radiative losses decrease as the relations ρ/λ, $n_{c0}/n_{c1}$ and H/λ increase, where ρ is the radius of the core of the focon, λ is the wavelength of the light wave in the particular optical material of the optical fiber, $n_{c0}$ is the refractive index of the inner core, $n_{c1}$ is the refractive index of the outer coating and H is the thickness of the ring with refractive index $n_{c1}$ (see FIG. 14.b). These losses can be evaluated utilizing the known theory of tunnelling waveguide modes. The "whispering gallery" waveguide mode is a particular case of the "tunnelling" waveguide mode when the propagation constant k satisfies the condition $ωn_{c1}/c$<k<$ωn_{c0}/c$, where ω is angular light frequency.

It has been shown that the index of transmission of light radiation from the core of radius ρ into the infinite coating is determined by the following expression $$T = T_f \exp\left\{-k \int_\rho^{r_{rad}} (\underline{\beta}^2 + \underline{l}^2 - n_{c1}^2)^{1/2} dr\right\}$$

where $\underline{\beta}=\beta/(2π/λ_0)$ is the propagation constant in the waveguide normalised relative to the propagation constant in a vacuum $β_0=2π/λ_0$, i.e. $\underline{\beta}$ is the normalised propagation constant of the "whispering gallery" mode along the axis of the cone, $\underline{l}=n_{c0}$ Sin $θ_z$ Cos $θ_φ$ is the normalised azimuth component of the wavevector, k=$ωn_{c0}/c$, $r_{rad}=ρ\underline{l}/(n_{c1}^2-\underline{\beta}^2)^{1/2}$, $T_f=(4/(n_{c0}^2-n_{c1}^2))$ $(n_{c0}^2-\underline{\beta}^2-\underline{l}^2)^{1/2}(\underline{\beta}^2-\underline{l}^2-n_{c1}^2)^{1/2}$.

In the case under consideration, the "whispering gallery" mode rotates about the axis of the azimuth of the lightguide φ and much more slowly shifts in the axial direction, i.e. $\underline{\beta}$<<$\underline{l}$, Sin $θ_z$≅1. Then $r_{rad}=ρn_{c0}$ Cos $θ_φ/n_{c1}$, $T_f=[4/(n_{c0}^2-\underline{l}^2)](n_{c0}^2-\underline{l}^2)^{1/2}(\underline{l}^2-n_{c1}^2)^{1/2}$. If light radiation is concentrated in a narrow strip near the side conical surface then Cos $θ_φ$≅1 and, therefore $\underline{l}$≅$n_{c0}$, $r_{rad}$≅$ρn_{c0}/n_{c1}$, $T_f$≅$8^{1/2}n_{c0}θ_φ/(n_{c0}^2-n_{c1}^2)^{1/2}$. Thus, $T_f$ is significantly less than 1 for small $θ_φ$. However, most of the attenuation takes place in the tunnel. The attenuation can be estimated as follows. Let Δ=$(n_{c0}-n_{c1})/n_{c1}$, where Δ=$(n_{c0}-n_{c1})/n_{c1}$≅0.01 . . . 0.05. The condition of availability of the tunnel is $r_{rad}$>ρ or $n_{c0}$ Cos $θ_{100}$ /$n_{c1}$>1. In the best case, when Cos $θ_φ$≅1 the radius of the tunnel $r_{rad}=ρn_{c0}/n_{c1}$. Then length of the tunnel is L=ρΔ, i.e.

since $\Delta=0.01 \ldots 0.05$ the length of the tunnel $1 \ldots 5\%$ the radius of the cone. Thus, to increase the length of the tunnel it is necessary to increase $n_{c0}/n_{c1}$ and/or $\rho$. One can see from the expression under the integral that the index of attenuation $\alpha$ in the tunnel changes along the tunnel. It is maximal and is equal to $\alpha_{max}=4\pi/\lambda_0(n_{c0}^2-n_{c1}^2)^{1/2}$ at $r=\rho$ and is minimal, that is $\alpha=0$, at the other end of the tunnel at $r=r_{rad}$.

If $n_{c0}=n_{c1}(1+\Delta)$ then $\alpha_{max}=4\pi n_{c1}(2\Delta)^{1/2}/\lambda_0$. For example, if $\Delta=0.02$, $n_{c1}=1.46$ then $\alpha_{max}\cong 3/\lambda_0$, i.e. the light field decreases by $e^3$ times as the radius increases by $\lambda_0$.

Thus, attenuation over a distance of about $10\lambda_0$ is large enough to displace the maximum of the light field from the glass-air boundary and to eliminate the influence of various cylindrical side surface imperfections on light losses. The minimal radius of the focon in this case is $\rho=L/(n_{c1}\Delta)\cong 0.33$ mm.

Note that the light field that penetrates through the tunnel is not a radiative field and, therefore, there is no loss of light power from the focon. The glass-air boundary confines the light radiation as before.

In the case when the thickness S of a strip of light radiation in the core has a definite size, the length of the tunnel decreases to the value $S=\rho(n_{c0} \cos\theta_\phi/n_{c1}-1)$. Taking into account the condition of availability of the tunnel $n_{c0} \cos\theta_\phi/n_{c1}>1$, one obtains $\cos\theta_\phi>n_{c1}/n_{c0}$ and $S<\rho\Delta$. Thus, the value $\rho\Delta$ determines the thickness of the strip in which the light radiation can be concentrated. The relation between length of the tunnel L and the thickness of the strip S depends on the value $\theta_\phi$. For example if $S=L$ then $\cos\theta_\phi\cong 1-\Delta/2$, $\theta_\phi\cong\Delta^{1/2}$ and $L=\rho\Delta/2$ i.e. the length of the tunnel decreases by 2 times. The index of attenuation of the light field in the tunnel decreases accordingly.

At present, it is not only theoretically possible but also technically possible to fabricate a glass cone with an acceptable refraction index to concentrate light radiation inside the glass and thereby to decrease light losses. This approach is used widely for fibers but can be used successfully for glass cones with "whispering gallery" waveguide modes also.

Thirteenth Preferred Embodiment

Figure 15:
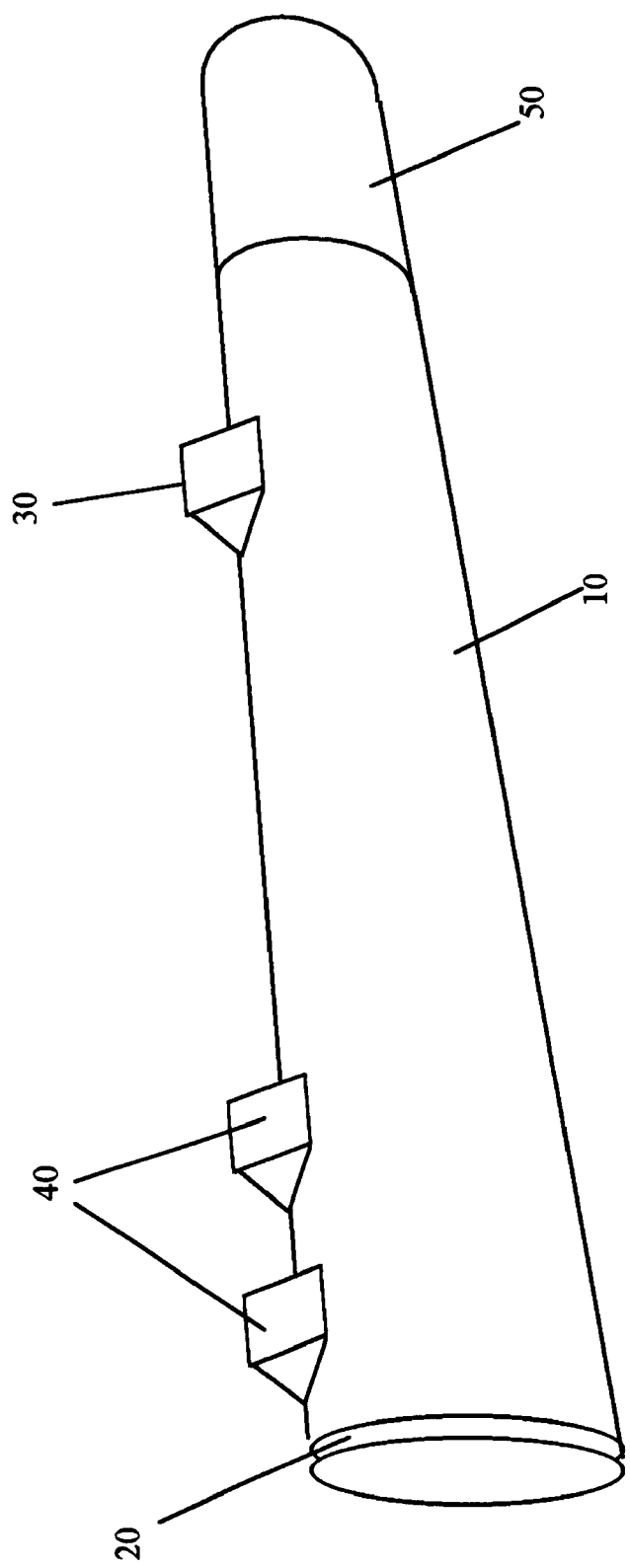
FIG. 15 is an embodiment of the invention
Figure 16:
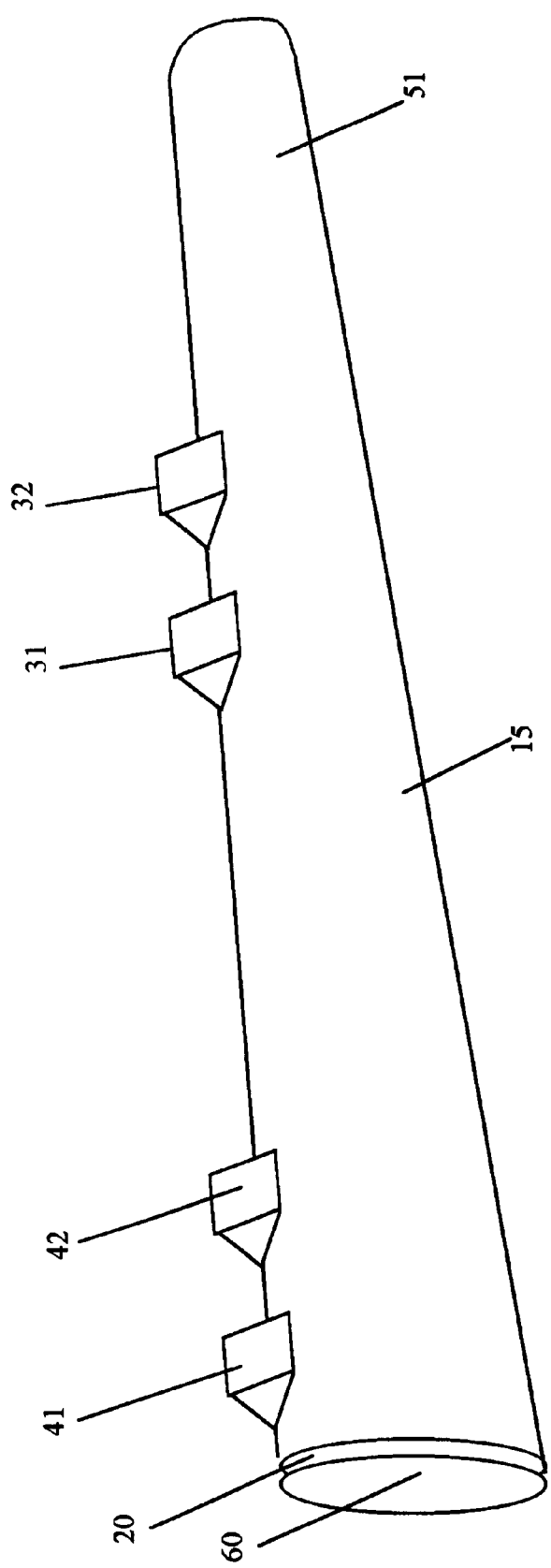
FIG. 16 is an embodiment of the invention.

The thirteenth preferred embodiment comprises a parametric optical apparatus with acoustic pump wherein the tapered end is extended to function as a matching load. This simplifies the fabrication of a parametric light amplifier-converter with acoustic pump. Referring to FIG. 15, matching load 50 is necessary to prevent reflection of the acoustic wave from the right part (tapered end) of the focon. Also illustrated in FIG. 15 are input couplers 40 and output coupler 30. In FIG. 16, the focon has been extended. FIG. 16 illustrates a focon 15, comprising an acoustic transducer 60, a first input prism 41, a second input prism 42, a first output prism 31, a second output prism 32, and an extended end 51. By absorbing the acoustic wave instead of allowing it to be reflected from the tapered end, a matching load improves the quality of the travelling acoustic wave in the region of interaction between the light and acoustic waves i.e. in the region between the first input coupling prism 41 and the last output coupling prism 32. Because the focon is fabricated by the same technology that is used for fabrication of glass fibers, a focon, such as the one illustrated in FIG. 16, where the length of the matching load exceeds the length of the region between the first input and last output coupling prisms can be fabricated without additional effort.

The elongated tapered end of the lengthened focon functions as a matching load. The length of the elongated tapered end is determined from the following considerations. As is known, the power of an acoustic wave $P_{ac}$ decreases exponentially along the z-axis of a glass cylinder in accordance with the expression $$P_{ac}(z)=P_{ac}(0)\exp(-\alpha z),$$

where $\alpha$ is the coefficient of losses. It is known also that $\alpha$ depends linearly on the frequency F of the acoustic wave, namely, $\alpha=\alpha_f F$, where $\alpha_f=0.7*10^{-7}$ c/m for fused quarts. The dimensionless coefficient $\alpha_t=\alpha_f v_a=4.2*10^{-4}$ is very useful for further considerations. It characterises the attenuation of an acoustic wave in the time equal to one period of oscillation $T=1/F$ or at distance equal to one wavelength $\Lambda$. It follows that the power of the acoustic wave attenuates by e times at the distance $L=\Lambda/\alpha_t\cong 2380\Lambda$. For example, if $F=100$ MHz then $\Lambda=60~\mu$ and $L=143$ mm. Thus, the length of the additional section used as a matching load is quite acceptable for practical use in all ranges of frequency F of the acoustic wave.

Fourteenth Preferred Embodiment

The fourteenth preferred embodiment comprises a parametric optical apparatus with acoustic pump wherein the acoustic transducer is fabricated from piezoceramic, such as, for example, in a piezoceramic plate. A piezoceramic module typically is much bigger than the nonlinear crystal modules usually used in acoustic transducers. Piezoceramic modules have large losses for frequencies above several megaherts and are not used to excite continuous acoustic waves. However, piezoceramic can be used for exciting power acoustic pulses with short edges and a low frequency of repetition. Such pulses increase the index of modulation m and consequently increase the maximal index of conversion. Similar acoustic pulses can be excited by applying high voltage electric pulses, such as those obtained with the use of high-frequency high-voltage field transistors, to the piezoceramic.

Figure 17A:
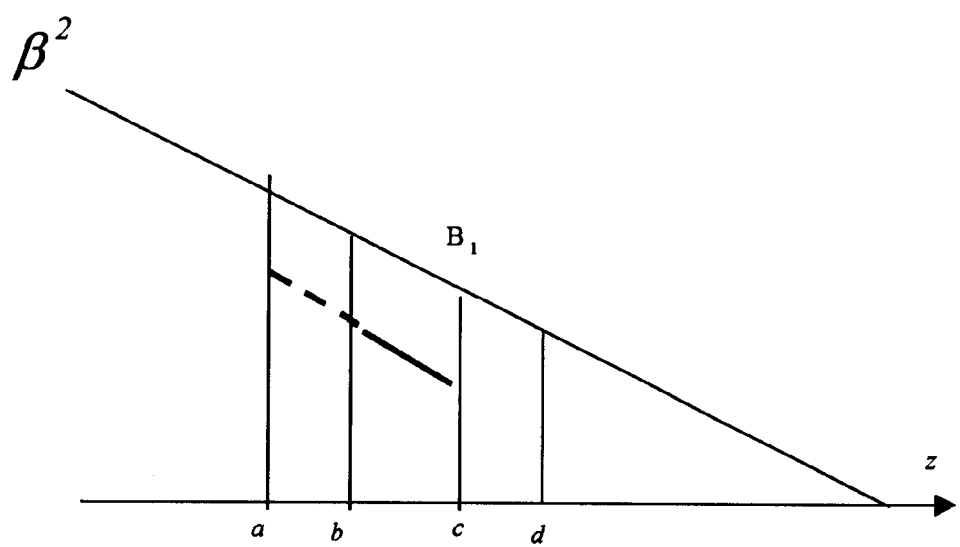
FIG. 17 presents relationships relative to the invention.

FIG. 17a shows the dependence of the square of the propagation constant $\beta^2$ for a light wave of the "whispering gallery type" on the position of the light wave along the axis (z) of a focon when a single acoustic pulse (indicated by the solid bold line) decreases the propagation constant in the segment bc. In the idealised case, the leading and trailing edges of the pulse equal zero. When a maximum of the propagation constant exists at point $B_1$, segment cd can be used as a resonator for a "whispering gallery" mode (WGM) light wave and segment cd can be used as a waveguide to guide a light wave. In the case under consideration, the waveguide formed by segment cd confines a WGM light wave. That is, the WGM light wave does not propagate outside of segment cd. As a result a waveguide resonator for the travelling wave is formed. The resonator can be considered as an open dielectric disk resonator for the WGM light wave. There is the tunnel bc to the left of point c. A light wave that enters tunnel bc from the left of point b can propagate in the focon. Thus, one need to consider not only the conditions required for the existence of a waveguide but also the requirement that losses of light radiation through the tunnel are acceptable.

Increasing the length of the acoustic pulse $\tau$ such that the pulse extends to the left of bc (as illustrated by the bold dotted line in FIG. 17a) exerts no influence on either the parameters of the waveguide or the parameters of the tunnel. The minimal length of the acoustic pulse L can be determined from the following considerations. An increase of the diameter of a focon by $\Delta D$ and an increase of the refractive index by $\Delta n$ have a similar influence on the propagation constant when $\Delta n/n=\Delta D/D$. Since $\Delta n/n=m$, $\Delta D=L^* \sin\alpha$, where $\alpha$ is the taper of the focon, then $L=mD/\sin\alpha$. For example, if $m=10^{-4}$, $D=10$ mm, $\sin\alpha=0.01$ then $L=10^{-4}$ $m=100~\mu$ and $\rho=L/v_a=16.6$ ns.

On the other hand, increasing the leading edge of an acoustic pulse has a much greater influence on the parameters of the waveguide and the tunnel. When the leading edge of the acoustic pulse extends to the right of segment cd, no maximums of $\beta^2$ exist and no resonators exist.

A gradual increase of the leading edge from zero results in a deterioration of the waveguide and a decrease of the length of the tunnel. On the contrary, an increase of the amplitude of the pulse has the reciprocal effect.

Sudden changes in the voltage applied to a piezoceramic plate changes the pressure in the plate. An acoustic pulse is generated when a step (that is, a sustained pulse) of voltage is applied to the piezoceramic plate. In the ideal case, the length of the acoustic pulses is equal to the thickness of plate. The value of the voltage step depends on the electric field strength in the plate but does not depend on the thickness of the plate. When the pressure in the plate disappears, the plate begins to expand. This results in the propagation of two similar positive pulses of pressure, one into the focon and one, 180 degrees out of phase, away from the focon. The first pulse enters the focon directly. The pulse that propagates 180 degrees out of phase with the first pulse reflects off the side of the plate farthest from the focon and enters the focon with a delay.

Theoretically, the same effect can be obtained with a mechanical shock applied to the face of the focon. However, in practice, it is very difficult to obtain the necessary sharp mechanical shock because the surfaces of the focon and striking object must meet very strict requirements.

Fifteenth Preferred Embodiment

The fifteenth preferred embodiment comprises a parametric optical apparatus with acoustic pump wherein a series of acoustic pulses is used instead of a single acoustic pulse to increase the efficiency of conversion. This feature enables one to decrease the length of the focon. When an acoustic pulse travels along the body of a focon, it forms an optical resonator that is capable of carrying light radiation. In such a resonator, the leading and trailing edges of an acoustic pulse reflect the light radiation. In addition, as the resonator travels towards the tapered end of the focon, the light radiation carried by the resonator also is confined radially by the side of the focon and the leading edge of the light radiation is confined by the tapering of the focon. A series of pulses increases the reflecting properties of the base, or trailing edge, of open dielectric resonators formed by acoustic pulses traveling towards the tapered end of a focon.

Figure 18:
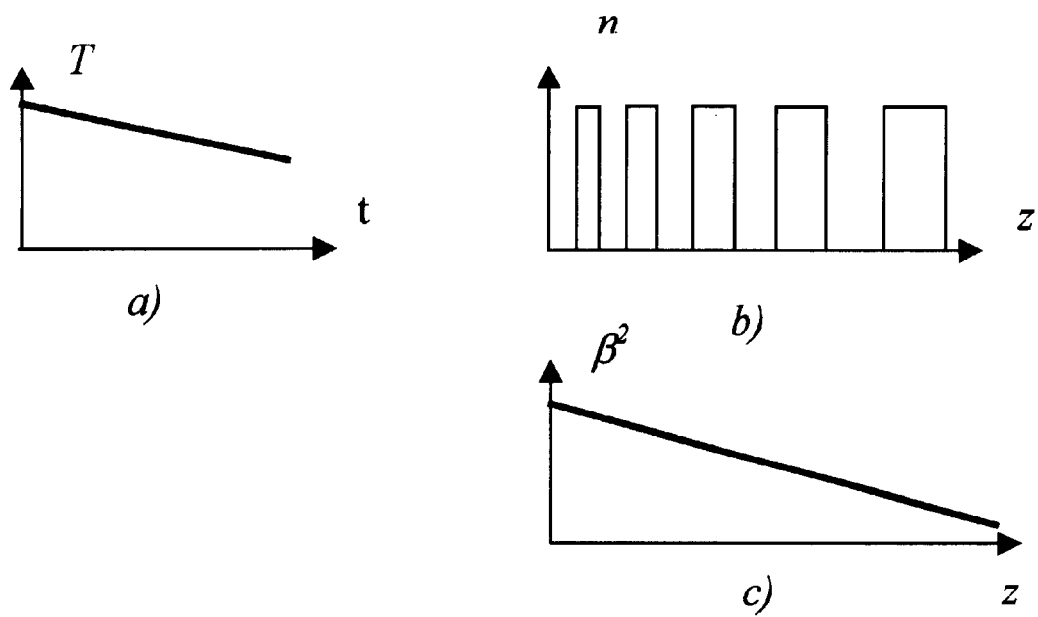
FIG. 18 presents relationships relative to the invention.

The dependence of the period T of the acoustic pulses on time t is shown in FIG. 18a. As illustrated in FIG. 18b, a series of acoustic pulses induces changes of the refraction index along the axis of the focon. The dependence of the light wave propagation constant on the position of the light wave (that is, the distance from the base) along the axis of the focon is shown in FIG. 18c. Consequently, the width of the DBR in increases.

The reflecting capability of the DBR is restored by increasing the taper of the focon. This requires decreasing the length of the focon which, in turn, results in decreasing the losses and, therefore, increasing the efficiency of conversion. If the length of the focon is unchanged, an increase of the taper of the focon results in an increase in the index of the frequency of conversion.

Sixteenth Preferred Embodiment

Figure 19:
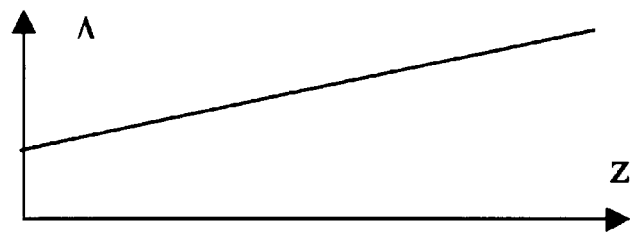
FIG. 19 presents a relationship relative to the invention.

The sixteenth preferred embodiment comprises a parametric optical apparatus with acoustic pump wherein an acoustic wave with gradually increasing frequency is used rather than an acoustic wave with constant frequency. In this case, the dependence of the wavelength of the acoustic wave $\Lambda$ on its position z along the z-axis of the focon is shown in FIG. 19. Since $\beta \sim \Lambda$, the dependence of $\beta$ on z is similar to that shown in FIG. 18c. As a result, the width of the DBR also increases.

Seventeenth Preferred Embodiment

Figure 20:
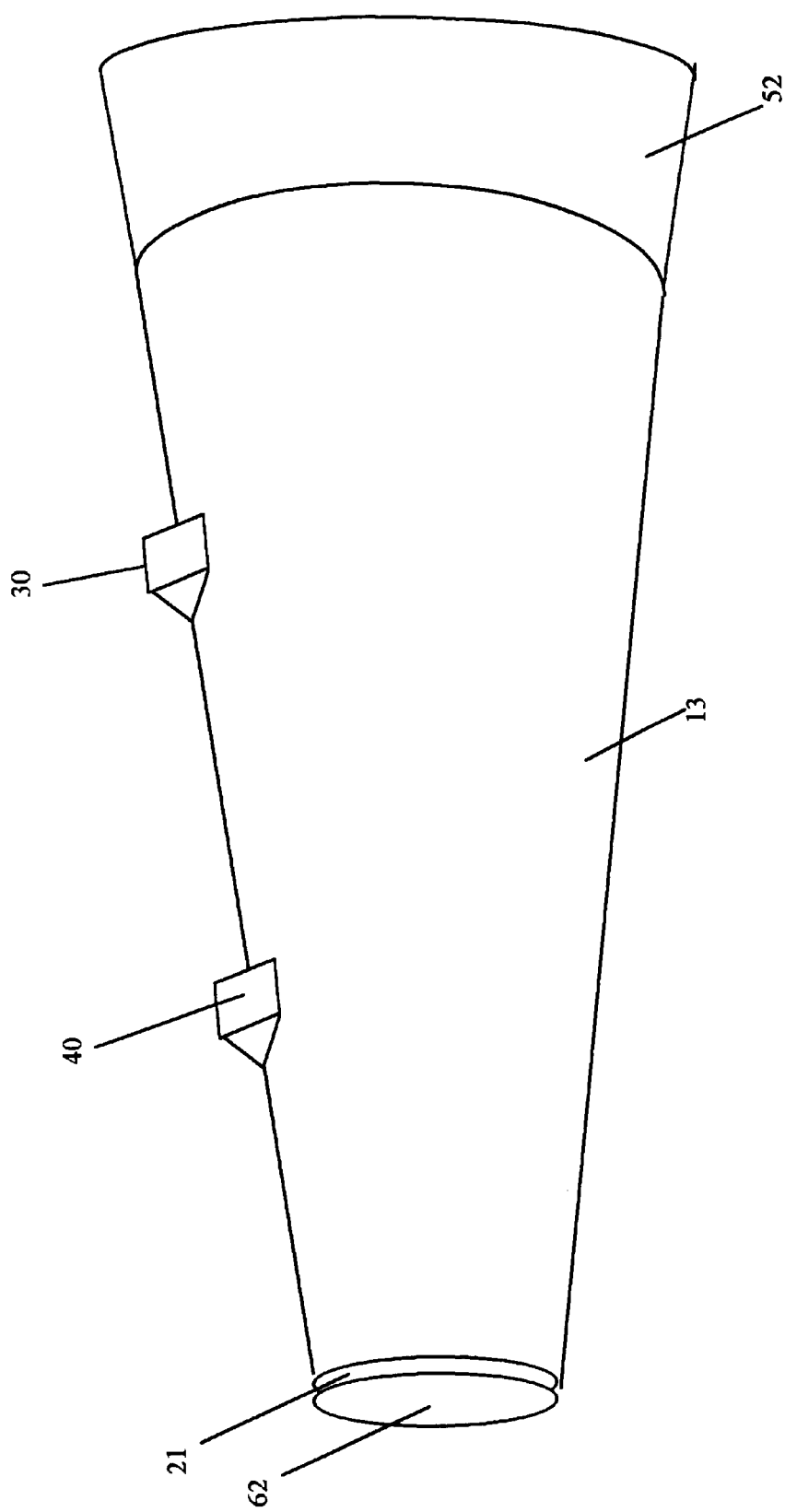
FIG. 20 is an embodiment of the invention.

The seventeenth preferred embodiment comprises a parametric optical apparatus with acoustic pump wherein the frequency of output light radiation depends on the power of the acoustic wave, that is, the frequency of the output light radiation is changed by changing the electrical power exciting the acoustic transducer, such as, for example a piezoelectric transducer. This provides a means for a rapid (electronic speed) change of frequency of the output light radiation. A simple explanation of the operating principles is presented for the parametric light down-converter shown in FIG. 20. In FIG. 20, the parametric light down-converter comprises focon 13, light input coupling prism 40, light output coupling prism 30, matching load 52 narrow base 21, and acoustic transducer 61. Notice that focon 13 in FIG. 20 is rotated 180° relative to focon 10. Also note that, in FIG. 20, the acoustic transducer is attached to the tapered end of the focon and the matching load is attached to the base of the focon.

The index of modulation m of the refractive index n in the down-converter decreases along the axis of the focon from the tapered end to the base. This is due, firstly, to a loss of power P of the acoustic wave and, secondly, to a decrease of the intensity I=P/S of the acoustic wave, where S is the area of the cross-section. Since $m^2 \sim I$ and S increase as the distance from the acoustic transducer increases, it follows that m decreases as the distance from the transducer increases. The dependence of m on the distance from the transducer is shown in FIG. 17b for various powers of the acoustic wave $P_1<P_2<P_3$, where z is the distance from the transducer.

Figure 17B:
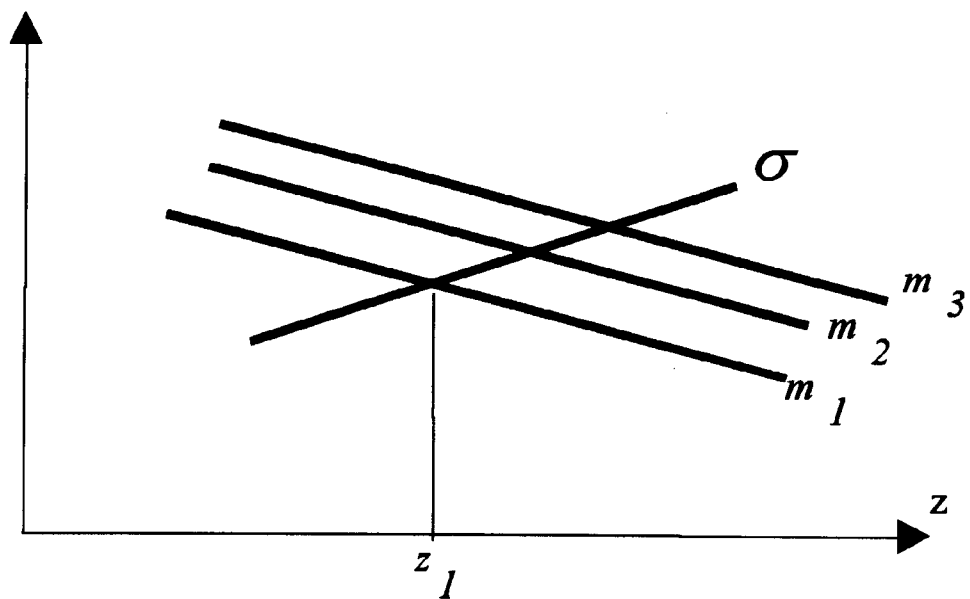

On the other hand, the dependence of the parameter $\sigma=(\Lambda/2\pi)dD(z)/dz$ on distance z takes the form shown in FIG. 17b also. The parameter $\sigma$ depends on the profile of the focon and can vary significantly. It should be noted that as $dD(z)/dz$ increases, $\sigma$ increases. Since m(z) is a decreasing function, the family of curves $m_1(z)$, $m_2(z)$, $m_3(z)$ are intersected by the curve $\sigma(z)$ when the index of modulation is large enough to perform the conversion. We see that condition (2) is valid in the region $\{0,z_1\}$ if the power of the acoustic wave is such that the index of modulation equals $m_1$. When $z>z_1$ the condition required for light conversion is not fulfilled and light radiation is no longer confined by the maximums of m formed by the acoustic wave. As a result, the synchronism between the light and acoustic waves is violated and the light wave propagates towards the wide part of the focon without frequency conversion. The light wave can be extracted from the focon by various means, for example, using an irregularity on the conical side surface of the focon. Thus, in this case, the index of conversion equals $C=D(z_1)/D(0)$.

If the power of an acoustic wave is increased from $P_1$ to $P_2$ then the index of modulation increases from $m_1$ to $m_2$ and the index of the frequency conversion increases from $D(z_1)/D(0)$ to $D(z_2)/D(0)$. Thus, the index of the frequency of conversion depends on the power of the acoustic wave. This property results in the unique ability of quickly changing the wavelength of the output radiation in about a microsecond.

Figure 21:
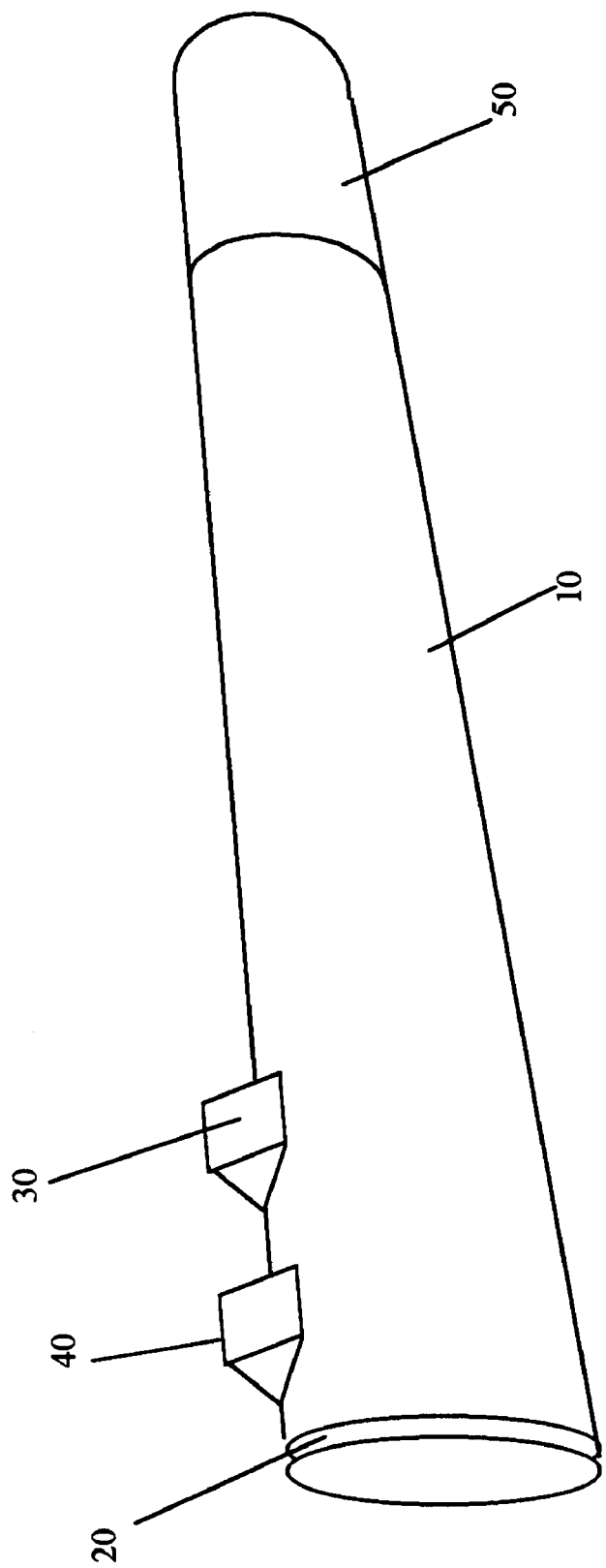
FIG. 21 is an embodiment of the invention.

The focon illustrated in FIG. 21 can be used for up-conversion of light frequency. Here a light wave is launched through light input coupling prism 40. Initially, the light wave and an acoustic wave propagate from the left to the right of the focon along the direction of propagation of the acoustic wave. In this case up-conversion takes place. The output light radiation frequency is controlled by the power of the acoustic wave. That is, changing the power of the acoustic wave changes the point along the axis of the focon at which condition (2) is violated. When condition (2) for light confinement is violated, the light wave propagates towards the wide part of the focon, i.e. in a direction opposite to the direction of the propagation of the acoustic wave. A light wave can be extracted from a focon by various means. For example, the wave can be expelled from the focon through an output coupling prism 30 or through a disruption on the conical side surface of the focon. Under the proper conditions, an input prism can also serve as an output prism.

Eighteenth Preferred Embodiment

Figure 22:
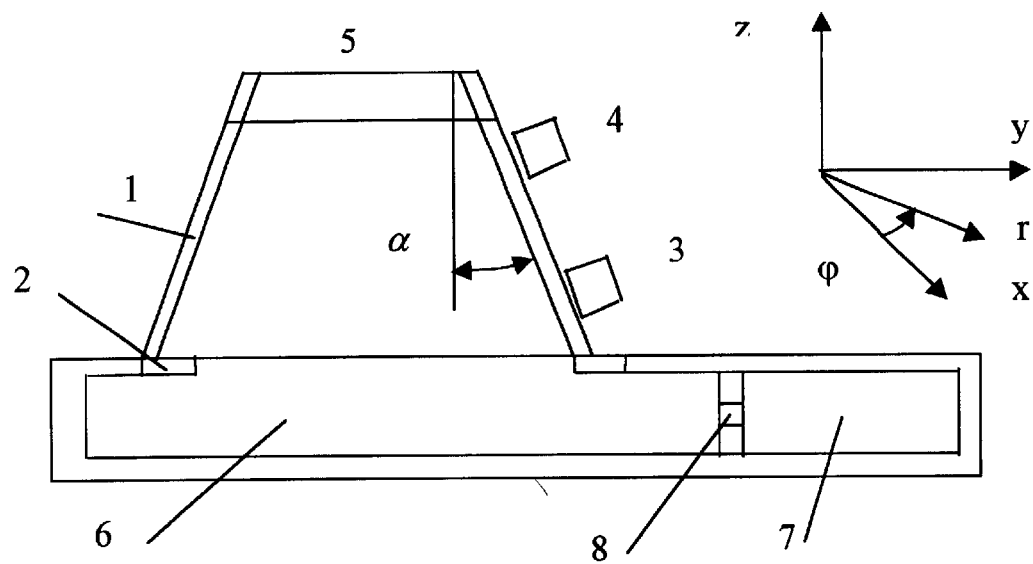
FIGS. 22 and 23 is an embodiment of the invention.

The eighteenth preferred embodiment comprises a parametric optical apparatus with acoustic pump wherein the amplification and frequency conversion of non-coherent light radiation with various wavelengths can be performed simultaneously. FIG. 22 is a schematic of a parametric optical apparatus with acoustic pump comprising (focon) 1, acoustic transducer 2, light input coupling prism 3, light output coupling prism 4, and matching load 5.

In this embodiment, the focon is preferably a glass truncated conical body of rotation having a hollow core and a wall thickness of about 1 mm or less. The acoustic transducer is a ring attached to the base (wise end) of the truncated cone. The acoustic transducer is used to excite a travelling acoustic wave. The traveling acoustic wave propagates from the base to the tapered end of the focon. Coupling prisms 3 and 4 are used in the usual way for entering and extracting light radiation. The matching load can be either attached to or an extension of the tapered end of the focon. Matching load 5 absorbs the travelling acoustic wave that is propagated in the truncate cone. The acoustic transducer 2 is placed in the electromagnetic field of a cylindrical cavity 6. A directional coupler 7 excites a rotating resonator mode. Coupling holes 8 serve for coupling between the rectangular waveguide of directional coupler 7 and cylindrical cavity 6.

Figure 23:
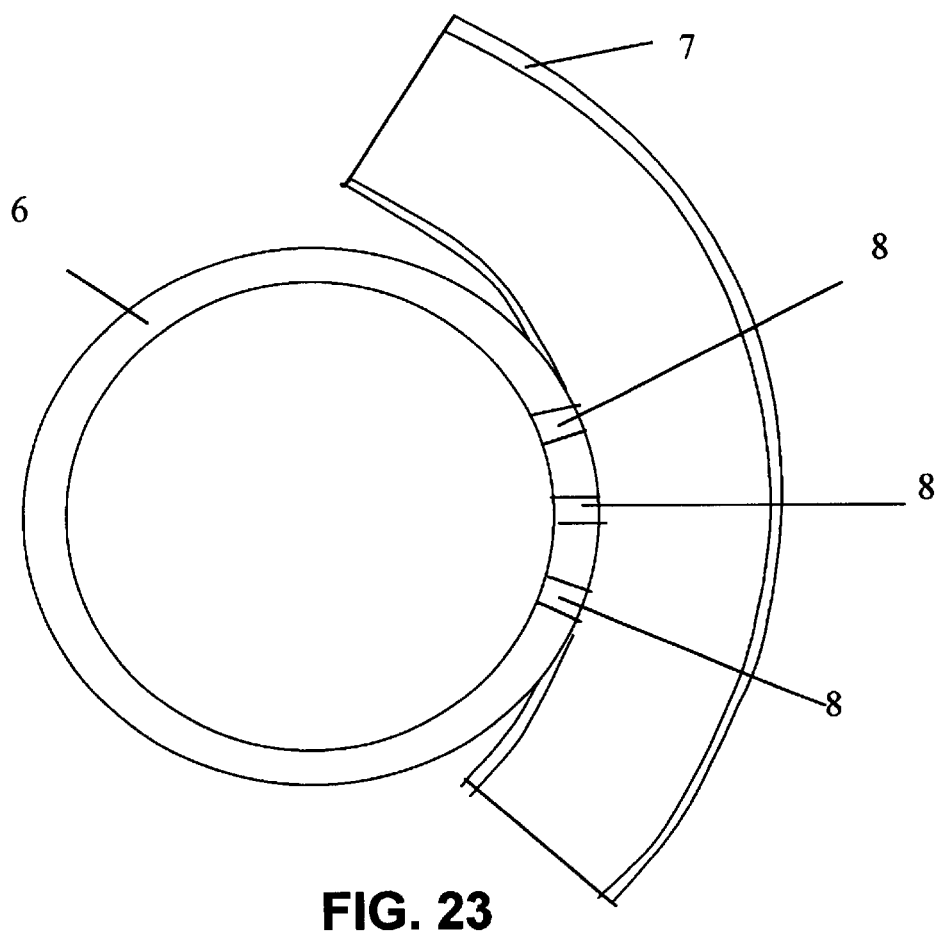
Figure 24:
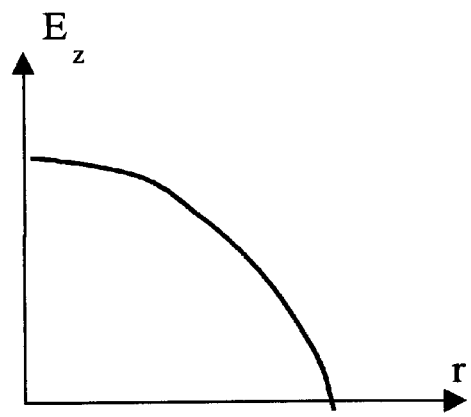
FIG. 24 presents relationships relative to the invention.
Figure 24:
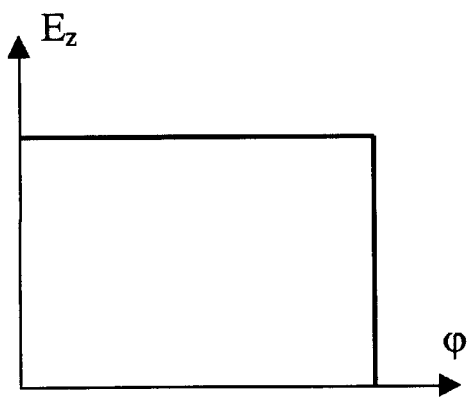
Figure 24:
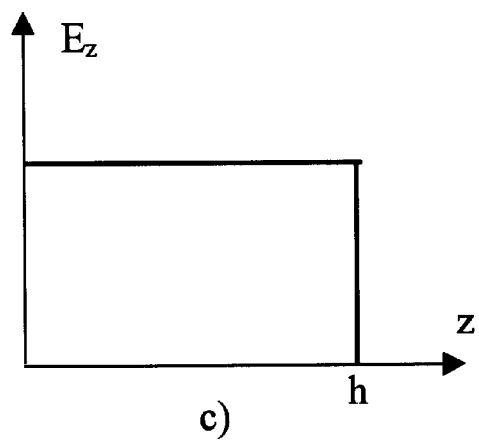

A cross-section of the cylindrical cavity 6 is shown in detail in FIG. 23. FIG. 23 is a cross section of the cylindrical cavity 6, directional coupler 7, The distribution of the z-component $E_z$ of the electric field in the resonator corresponding to the rotating resonator mode at a moment in time is shown in FIG. 24. $E_z$ is maximal in the center of the resonator where acoustic transducer ring. (FIG. 24a) The dependence of $E_z$ on the azimuth $\phi$ is shown in (FIG. 24b). FIG. 24b illustrates that one wavelength of the electromagnetic wave is excited in the cavity. At the same time, $E_z$ does not depended on the distance from the resonator (FIG. 24c). The components $E_x$, $E_y$ of the electric field in the cylindrical resonator is everywhere zero.

When an acoustic transducer ring is placed in a rotating electric field of the cylindrical cavity, an acoustic wave with one variation of pressure is excited in the optical medium of the focon. The distribution of pressure in an acoustic wave at $t=t_0$, $z=z_0$ coincides with the distribution of the electric field shown in FIG. 24b. The acoustic wave forms a spiral light guide in the truncated cone. This light guide rotates around the axis of the focon with an angle velocity $\Omega=2\pi F$ $s^{-1}$, where F is the frequency of modulation, i.e. the resonance frequency of cavity 6.

The dependence of the refractive index on z, $\phi$, t in a spiral lightguide formed by an acoustic wave can be expressed as follows.

$$n=n_0\{1+m \cos[(2\pi \cos\alpha/\Lambda)(z-z_0)+\Omega t+\phi]\},$$

where the angle $\alpha$ is shown in FIG. 22. As same dependence of $n(z,\phi,t)$ results when a spiral light guide is rotated around its axis with an angle velocity $\Omega$, it follows that the acoustic wave forms a spiral lightguide that rotates around its axis with angle velocity $\Omega \cong 2\pi 10^8$ $s^{-1}$. Because the greatest angle velocity that can be achieved by mechanical rotation is about $\Omega_m=2\pi 10^4 s^{-1}$ the acoustic wave provides rotation with an angle velocity that exceeds $\Omega_m$ by a factor of about 10,000.

In a cone, azimuth independent acoustic waves form moving dielectric resonators that store light radiation. As the resonators travel into the narrow part of the cone, their diameters decrease and the light radiation is compressed. Unlike azimuth independent acoustic waves, an acoustic wave with one variation of pressure around the axis of the azimuth forms a moving spiral waveguide in a cone. The power of any light propagated in a lightguide of this kind can be amplified and its frequency can be increased. It has been shown that, in a moving curved lightguide, there is an increase of light frequency by e times when a light wave makes $N_e=(c/v)/(2\pi n)$ revolutions, where v is the component of velocity of the segments of the lightguide directed towards the center of curvature. In this case, the index of conversion C depends on the number N of coils of the spiral lightguide between the input and output coupling devices and is determined as follows $C=\exp(N/N_e)$. It should be noted that $N_e$ does not depend on either the frequency of modulation F or on the index of modulation m. These parameters determine the ability of a moving light guide formed by an acoustic wave to guide a light wave. As before, the condition m>σ must be satisfied for a light guide to confine light radiation.

Figure 25:
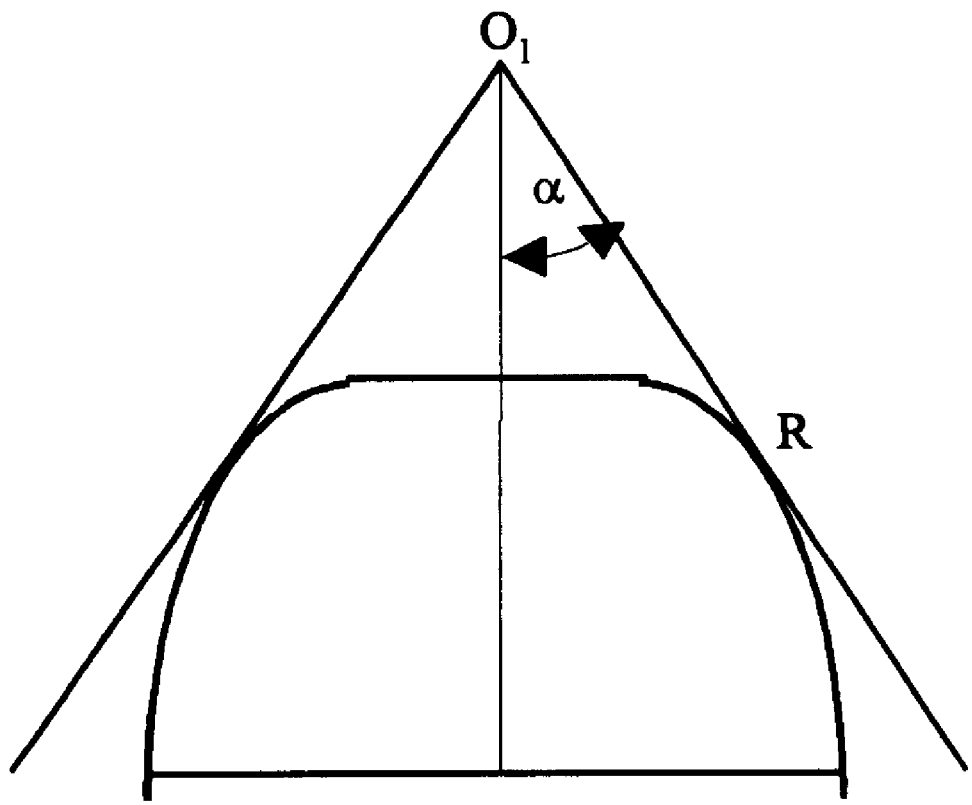
FIG. 25 presents a relationship relative to the invention.

In this case, $\sigma=(\Lambda/2\pi D)dD/dr$ and $D(r)=D(0)+(r-r_0)\sin\alpha$, where D and $\alpha$ are the diameter and taper, respectively, of an imaginary cone. The cone has vertex $O_1$ which is the point of intersection of the axis of the cone and a line that is tangent to the side surface of a body of rotation at a point R. The distance $r_0=O_1R$, r is the distance between the vertex $O_1$ and the point R at the line $O_1R$. Then we have $\sigma=\Lambda/(2\pi L)$, where L is the length of $O_1R$ in FIG. 25. If m>σ, then $N_c>1/(2\pi m)$, where $N_c$ is the number of spiral waveguide coils in the imaginary cone. For example, if $m=10^{-4}$, $F=10^8$ Hz, Cos $\alpha=0.8$ then $N\cong 2000$, $H\cong 120$ mm, the total time of conversion $\tau=NT=20$ $\mu s$, the total length of the spiral lightguide $s=(c/n)\tau\cong 4$ Km, and the mean length of the coils $l=S/N\cong 2$ m.

A peculiarity of light amplification/conversion in a rotating spiral lightguide is the absence of any resonant components. That is, in a rotating spiral lightguide, light amplification/conversion does not have any resonant components. Thus, the amplification/conversion of light radiation can be accomplished with any wavelength and, therefore, with any spectrum, and in particular, with incoherent white light.

Nineteenth Preferred Embodiment

The nineteenth preferred embodiment comprises a parametric optical apparatus with acoustic pump wherein a surface acoustic wave, rather than a bulk acoustic wave, is excited in a cone. Surface acoustic waves (SAW) are used widely in many acoustooptic devices because the acoustic power required can be decreased. It is worthwhile to use SAW in the present invention for the same reasons.

Twentieth Preferred Embodiment

The twentieth preferred embodiment comprises a parametric optical apparatus with acoustic pump wherein specific coupling devices are used. The input/output problem of light radiation into/out of moving resonators exists because coupling is done with moving objects whose forms change as they move. Nevertheless, the problem is solved by the same means known for coupling with motionless objects because the velocity of the movement is less than the velocity of light by a factor of 30000. The most widespread coupling means are coupling prisms as shown in the figures. However, coupling prisims are not the most suitable coupling devices in many practical applications. For example, the coupling devices that provide coupling between a curved fiber and a segment of another fiber are more suitable for coupling with moving circlular resonators and curved lightguides. Similar couplers are disclosed in many patents, in particular, in the following ones.

U.S. Pat. No. 4.898.444, 2/1990, Grimes et al, USCl. 385-31, Non-invasible optical connector.

U.S. Pat. No. 4.768.854, 9/1989, Campbel et al, USCl 385-32 Optical fiber distribution network including nondestructive taps and method using same.

4.889.403, 12/1989 Zucker et al, USCl 385-32, Distribution optical fiber tap.

4.983.007, 1/1991, James et al, USCl 385-32 Optical coupling device.

Figure 26:
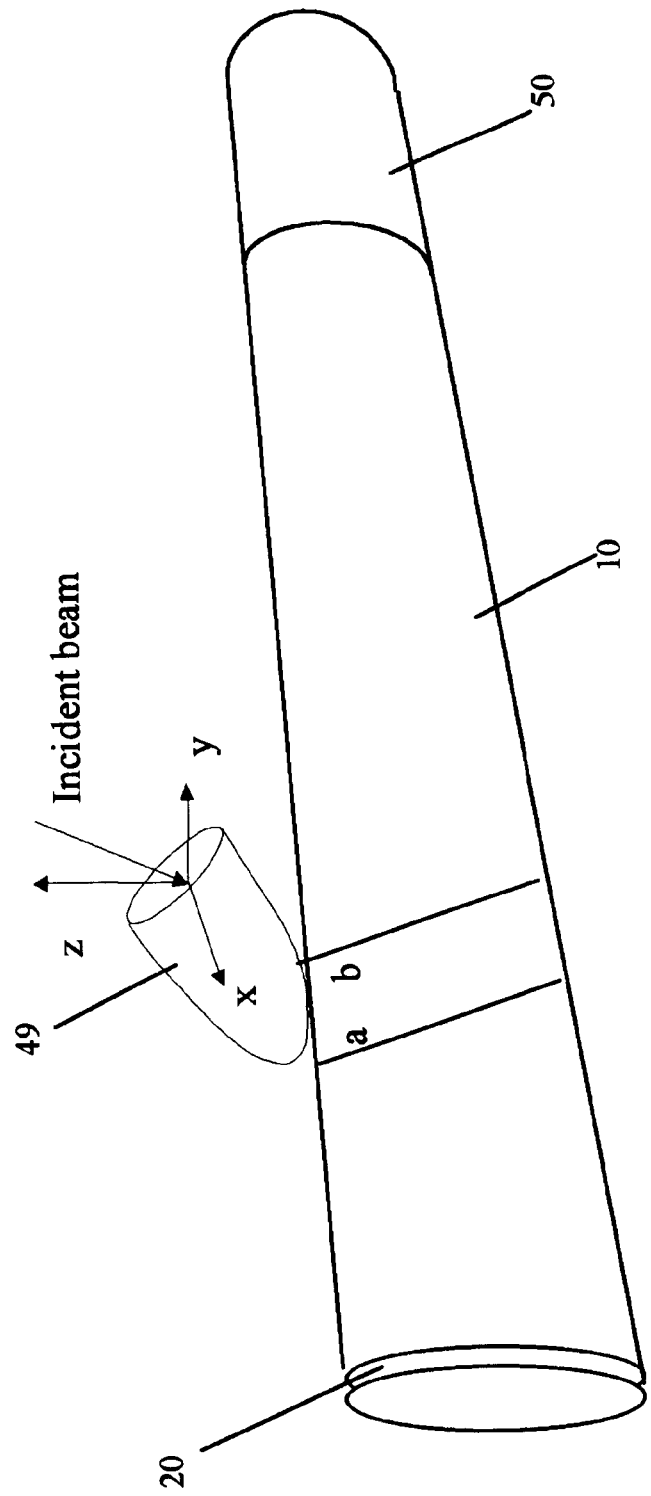
FIG. 26 is an embodiment of the invention.

Another coupler is illustrated in FIG. 26. To provide coupling at a small length of about Λ, a glass coupling focon 49 is used. As illustrated in FIG. 26, the tapered end of the coupling focon is curved. This means of coupling permits the index of coupling to be adjusted. In the case illustrated in FIG. 26, the total evanescent light field of the two focons has a small length along the z-axis. As is known, a light beam that is launched in an entry point near the conical side surface of a focon excites "whispering gallery" waveguide modes that propagate towards the narrow part of the focon. A travelling light wave of this type reaches a turning point and then propagates in the opposite direction. Thus, in this case, there is a standing light wave along the axis of the focon 10. However, in each cross-section of focon 10 there is a rotating light field as if the light wave rotates around the axis of the focon. The situation is directly opposite to that for a travelling wave in a typical waveguide, where there is a standing wave in each cross-section and a travelling wave along the axis of the waveguide.

Referring again to FIG. 26, in the region ab to the left of the turning point, the "whispering gallery" light wave attenuates exponentially. By changing the angles that the light beam makes with the co-ordinate axes of the coupling focon, the position of the turning point along the axis of focon 10 changes. And, consequently, the position of the region ab can be changed. If the region ab resides in an area where evanescent fields of the two focons intersect, movement of the region ab along the axis of Focon 10 changes the coupling index between the focons. (Coupling by the use of evanescent fields of light waves of the whispering gallery modes was disclosed by Basu in U.S. Pat. No. 5,039,192.) As a result, the coupling index can be changed by changing the angles the light beam makes with the co-ordinate axes of the coupling focon. This fact enables tuning without any mechanical movement of the focons relative to each other. Furthermore, in a focon, a light wave is focused near its return point (this property is reflected in the word focon— focusing cone).

Twenty First Preferred Embodiment

The twenty first preferred embodiment comprises a parametric optical apparatus with acoustic pump without the use of an acoustic transducer as schematically illustrated in some of the figures. In certain applications, the power of an input light wave launched into a focon or conical capillary tube is sufficient to form an acoustic wave and a region with increased refractive index due to the phenomenon of electrostriction. That is, the powerful light wave creates the acoustic wave which in turn creates the region of increased refractive index. This phenomenon is responsible for so called self-focusing that is observed in bulk optical mediums, and in particular, in glasses. In a focon, self-focusing appears as or results in "self-confinement" of light radiation along the z-axis of the focon. Thus, in a focon, an open dielectric resonator can be formed not only by an acoustic wave excited with an acoustic transducer but also by the power of a light wave that is destined for conversion. For example, consider the case when a powerful light wave is introduced into a focon. The light wave generates an acoustic wave without there being any need to excite an acoustic wave by means of a piezoelectric transducer. The acoustic wave generated can be used for converting the wavelength and increasing the energy of the light wave. Thus, light wave energy is first transformed into acoustic wave energy, and, then, that acoustic wave energy is transformed back into light wave energy.

When an open dielectric resonator is formed in a focon by an acoustic wave, the resonator starts moving along the axis of the focon towards the base of the focon due to the same reasons that force movement of a light beam in the focon towards its base. As has been shown, the energy of light radiation stored in a resonator decreases because the cross-section of the resonator increases and the energy of the stored light radiation is transformed into the energy of elastic compression of the optical medium.

The volume density of the light radiation energy that produces the effect of self-confinement and forms the optical resonator is much greater than the volume density of the acoustic pulse of elastic compression that confines light radiation. Therefore, the transition of the energy of light radiation into the energy of elastic compression is limited by the optical medium's ability to tolerate mechanical compression or pressure. However, if redundant light energy is removed from the resonator by one means or another the further exchange between the light and acoustic energies can take place in both directions.

Figure 27:
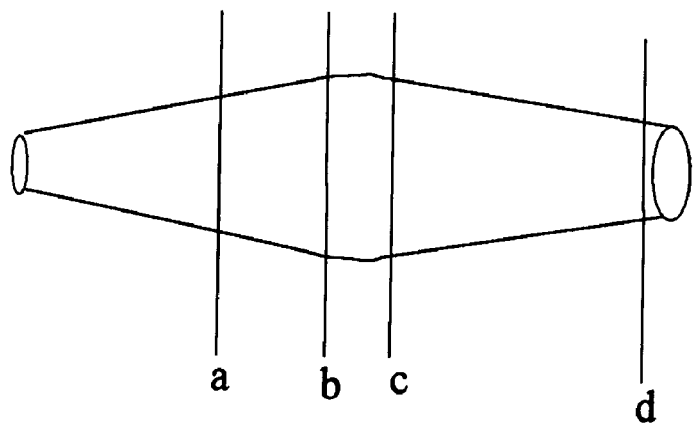
FIG. 27 is an embodiment of the invention.

In FIG. 27, the profile of the diameter of a glass cone is shown where the energy of an acoustic wave is transferred back into light radiation. The resultant output light frequency can be greater than the light frequency of the input wave. In FIG. 27, the energy of light radiation is transferred into acoustic wave energy in the region ab. If a part of the energy of the light radiation is removed from the resonator in the region bc then a gradual increase in the light frequency occurs in the region cd. As usual, the index of frequency conversion C is equal to the ratio of the diameters of the focon at the input and output of the light radiation i.e. $C=D_d/D_a$.

Twenty Second Preferred Embodiment

The twenty second preferred embodiment comprises a parametric optical apparatus with acoustic pump wherein the wavelength of the output radiation is changed by means of changing the power of the input radiation. The operating principles are similar to those of the sixth parametric optical apparatus. However, the increase in the refraction index in the moving resonators is controlled not by the power of an acoustic wave but by the power of an input light wave.

Twenty Third Preferred Embodiment

Figure 28:
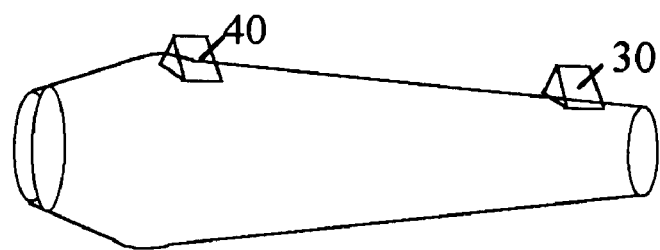
FIG. 28 is an embodiment of the invention.

The twenty-third preferred embodiment comprises a parametric optical apparatus with acoustic pump wherein a glass cone with a barrel-shaped segment as shown in FIG. 28 is used. Note that although the figure depicts a barrel shaped segment attached to a truncated cone on either side, the advantages of a barrel shaped segment can also be realized when only one cone is attached to the barrel shaped segment. In FIG. 28, there is a certain region where the diameter of the focon decreases on movement from the center of the barrel-shaped segment in either direction.

An example of a barrel-shaped segment is a disc cut through a sphere, where the planar surfaces of the disc are parallel to and on either side of the equator of the sphere. Preferably, the planar surfaces of the disc are equidistant from the equator of the sphere.

Light radiation entering the barrel-shaped segment is located in a limited region. Light radiation is confined in the barrel-shaped segment for the same reasons as light radiation is confined near the equatorial plane in a glass ball.

A barrel-shaped segment is useful in some applications. The property of confinement of light radiation to the barrel-shaped segment eliminates the following drawback of a light converter based on the glass focon. Light radiation entering a glass focon by means of a glass coupling prism 40 at the time when a moving resonator is absent under the prism propagates towards the base of the focon and reflects back into the focon from the base of the focon and scatters. As a result, the whole focon is filled with light radiation that appears as noise that penetrates through the output coupling prism 30.

The main advantages of a barrel-shaped segment are obtained when a single acoustic pulse or a series of acoustic pulses are used instead of a continues acoustic wave. In this case, the light radiation accumulated in the barrel-shaped segment is pushed out of the barrel-shaped segment into the narrow part of a focon attached to that segment. In effect, the acoustic pulses act similar to a plunger. The corresponding increase of energy and frequency of the light radiation takes place therewith.

Twenty Fourth Preferred Embodiment

The twenty-fourth preferred embodiment comprises a parametric optical apparatus with acoustic pump wherein losses of conversion are decreased due to a special form of glass cone and mode of an acoustic wave. Losses of conversion are proportional to the length of the glass cone. Since the minimal length L of the glass cone is determined by the index of conversion and the intensity of the acoustic wave and can not be less than a certain limit for each specific case of conversion, the time of conversion can be decreased by increasing the velocity of the acoustic wave in a waveguide. It is known that the phase velocity of an acoustic wave in a planar sound-guide can be increased significantly when certain relations between the wavelength of the acoustic wave Λ and the thickness of the sound-giude are valid. Unfortunately, because the diameter of the cone changes along its length, a significant increase of the phase velocity can be obtained along only a small part of the focon.

Figure 29:
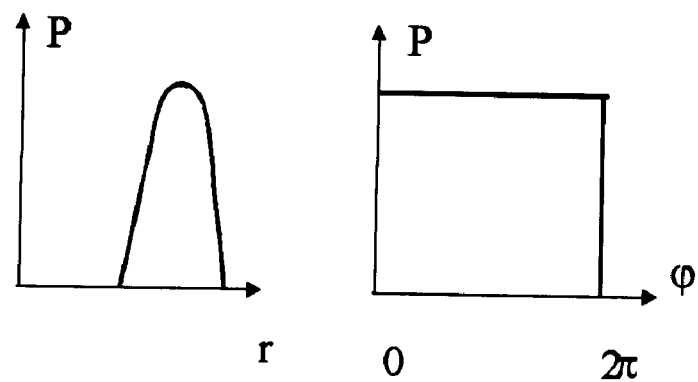
FIG. 29 presents relationships relative to the invention.
Figure 30:
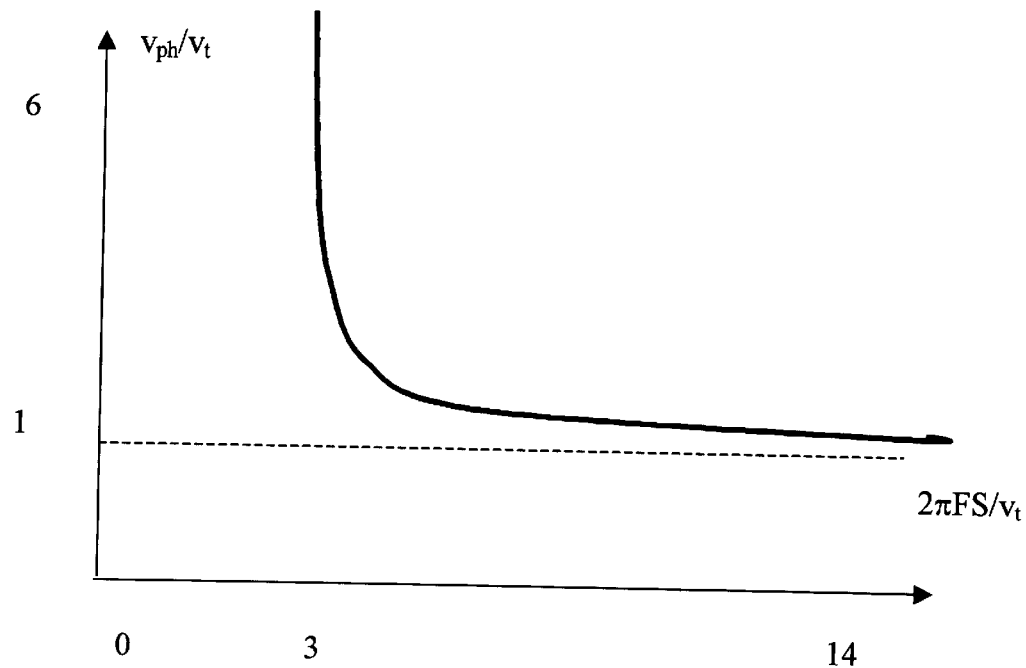
FIG. 30 presents a relationship relative to the invention.

The problem can be avoided if the waveguide mode of the acoustic wave is chosen so that its phase velocity does not depend on the diameter of the focon. There are no such modes in a solid focon. But modes of this type exist in a conical capillary tube with a cross-section in the form of ring. If the thickness of the ring is constant along the capillary tube then the waveguide mode of an azimuth-independent symmetrical Lamb wave with one variation of pressure along the ring radius has, firstly, a constant phase velocity and, secondly, a phase velocity that may be significantly greater than the velocity of an acoustic wave $v_a$ in solid glass. The dependence of the pressure P in the symmetrical Lamb wave on the radius r and the azimuth ($\phi$ in the conical capillary tube are shown in FIG. 29. The conical capillary tube can be imagined as a part of a planar sound-guide with thickness S that is rolled up into a conical capillary tube with thickness of its walls equal to S. As is known, a Lamb wave in a planar sound-guide with one or several variations of pressure along the width of the sound-guide has a cut-off frequency $F_c$, i. e. waveguide modes of these types with frequencies $F<F_c$ can not propagate in the sound-guide. For example, the dependence of the phase velocity $V_p$ (also referred to as $V_{ph}$) on the frequency for the Lamb wave with one variation of pressure along the radius is shown in FIG. 30. Here $V_t$ is the velocity of the transverse acoustic wave in a bulk medium, S is the thickness of the sound-guide, F is the frequency of the Lamb wave. In the case $2\pi F_c S/V_t \cong 3$. The wave with $F \cong 3V_t/(2\pi S)$ theoretically has an infinite phase velocity. In this case, there is resonance along the thickness. Thus a significant increase of the velocity of moving dielectric resonators is obtained by means of the use of acoustic Lamb waves.

A conical capillary tube can be fabricated with a refractive index n that changes along the radius of the ring in the same manner as in the first parametric optical apparatus with a solid glass cone. The energy of a light wave of the whispering gallery mode resides near the side or conical surface of the focon and is absent along the axis of a focon. On the other hand, the energy of an acoustic wave is distributed across the entire cross section of a focon. When a focon has a hollow core, as in, for example, a conical capillary tube, the energy of the acoustic wave is absent in the hollow core and is forced to reside closer to the conical surface nearer to the energy of the light wave. Thus the use of a conical capillary tube permits the maximums of the light and acoustic energy fields to reside in the same space. This results in a more effective interaction between the light and acoustic waves and, therefore, permits a decrease in the power of the acoustic wave or an increase in the index of conversion for an acoustic wave of the same intensity.

It should be noted that the group velocity $v_g$ of an acoustic wave in a waveguide is inversely proportional to its phase velocity $v_p$. In this case, the velocity of propagation of the acoustic energy $v_p$ decreases by the factor $v_a/v_p$. Therefore, if the power of the acoustic wave is constant (the flow of acoustic energy along the waveguide is constant), the density of energy of the acoustic Lamb wave in the waveguide increases by a factor of $v_a/v_p$. This results in an increase of the index of modulation m by a factor of $(v_a/v_p)^{1/2}$. In other words, to obtain the same indexes of modulation, the power of the acoustic Lamb wave is less by a factor $v_a/v_p$ than the power of the usual longitudinal acoustic wave. The group velocity $v_a$ of the usual longitudinal acoustic wave is equal to the velocity of the acoustic wave in solid glass.

Finally, because the area of the cross-section of the capillary tube is less than the area of the cross-section of a solid focon with the same diameter, the intensity of an acoustic wave in a focon is less than the intensity of an acoustic wave in a capillary tube, all other things being the same.

Twenty Fifth Preferred Embodiment

The twenty-fifth preferred embodiment comprises a parametric optical apparatus with acoustic pump wherein a conical capillary tube with variable thickness of its walls is used. In this case, a conical capillary tube in which the propagation constant B changes along the axis of the tube can be obtained. Because the propagation constant B is variable, an increase in the conversion efficiency and/or the index of conversion can be obtained not only by varying the frequency of acoustic pulses but also with a continues acoustic wave with unchanged frequency.

Figure 31:
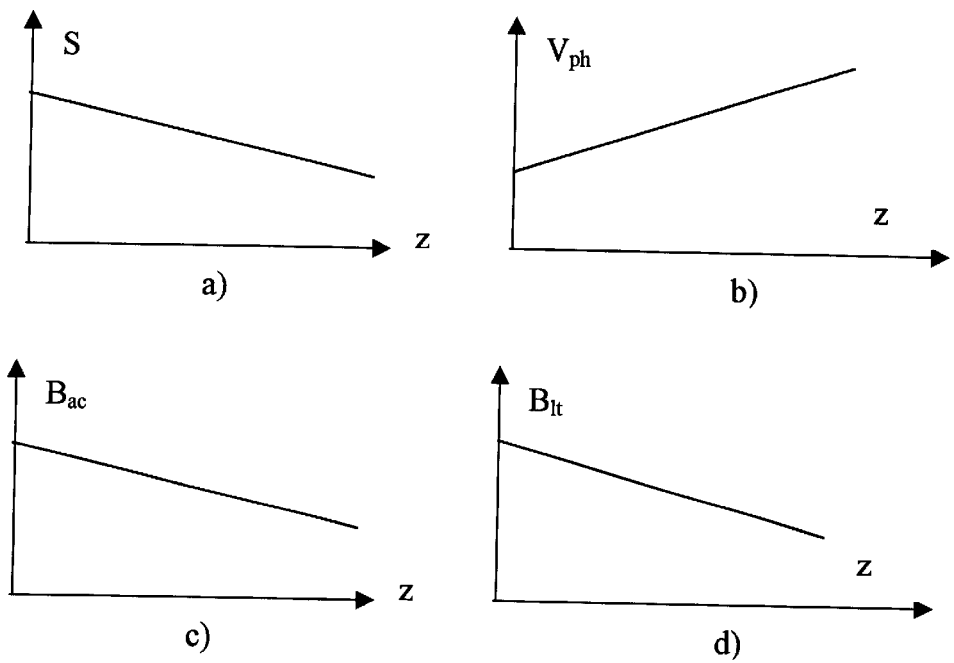
FIG. 31 presents relationships relative to the invention.

In this case, a change of the propagation constant B of the acoustic wave along the z-axis of the focon is based on the peculiarities of the propagation of acoustic Lamb waves in sound guides in the form of capillary tube with variable wall thickness. As is seen in FIG. 30, the phase velocity of the acoustic wave decreases as the thickness S of the walls of the capillary tube increases. FIG. 31a shows the dependence of the thickness S and the phase velocity of the Lamb acoustic wave in a conical capillary tube on the position along the z-axis. Then in accordance with FIG. 30, and as is shown in FIG. 31b, the phase velocity of the Lamb wave $V_{ph}$ increases as z increases. Because the propagation constant $B_{ac}$ of the acoustic wave in a sound guide is determined by the expression $B_{ac}=2\pi F/V_{ph}$, $B_{ac}$ decreases as z increases, as is shown in FIG. 31c. Thus, the Lamb acoustic wave with constant frequency forms a DBR with variable $B_{ac}$ in a sound guide with variable thickness of the ring. The DBR is similar to the DBR that is formed in a sound guide with constant wall thickness either by a fragment of an acoustic wave with gradually increasing frequency or by a series of acoustic pulses with a decreasing period of repetition. The propagation constant $B_{lt}$ of "whispering gallery" light wave in a conical capillary tube decreases as z increases, as is shown in FIG. 31d. Comparing FIG. 31c and FIG. 31d we can see that both $B_{ac}$ and $B_{lt}$ decrease as z increases. As a result, the region of the DBR where $B_{ac} \cong B_{lt}$ increases results in an increase of the confinement of light radiation.

The use of a conical capillary tube with Lamb acoustic wave increases the efficiency of light conversion significantly. Further increases in the efficiency of conversion results from the use of variable wall thickness in a conical capillary tube.

Twenty Sixth Preferred Embodiment

The twenty-sixth preferred embodiment comprises a parametric optical apparatus with acoustic pump comprising a glass cone with a homogeneous refraction index. In this case, the losses of conversion increase but the problems of input/output light radiation in/out of the cone are simplified. These properties can be attractive in some applications. Furthermore, this feature simplifies fabrication.

Twenty Seventh Preferred Embodiment

The twenty-seventh preferred embodiment comprises a parametric optical apparatus with acoustic pump comprising a lightguide having a regular polygon or rectangular cross section. This further simplifies the problems related to the input and output of light radiation into and out of the lightguide.

Twenty Eighth Preferred Embodiment

Figure 32:
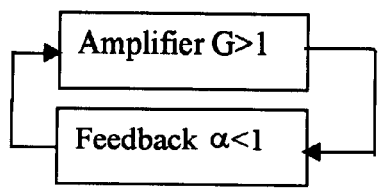
FIG. 32 is a schematic of an embodiment of the invention.

The twenty-eighth preferred embodiment comprises a parametric optical apparatus with acoustic pump that is used to provide a generator of coherent light due to the energy of the acoustic wave. As is known, any amplifier can be transformed into a generator by means of introducing a feedback, i.e. by transmission of a part of the energy from the output of the amplifier to its input. The known general block-diagram of a generator based on an amplifier is shown in FIG. 32. If the gain of the amplifier is G and the index of feedback is $\alpha$ then the condition $\alpha G=1$ is satisfied in a steady-state of the generator.

In this apparatus, the situation is more complicated because the input and output frequencies of the amplifier are different and an additional device is required to convert the output frequency to the input frequency. Unfortunately, conventional down-converters based on nonlinear crystals are not suitable for this purpose because the following Manley-Rowe relation $P_{in}/P_{out}=f_{in}/f_{out}$ is valid for them. In the case of a down-converter we have $P_{out}=P_{in}(f_{out}/f_{in})$, i.e. the index of attenuation of the down-converter is $f_{out}/f_{in}$. As has been shown above, the gain of the presented amplifier-converter is $f_{in}/f_{out}$ in the accepted notation. As a result, the total index of transmission $\alpha G$ in the broken feedback loop is equal to 1. Taking into account inevitable losses we obtain $\alpha G<1$.

The situation can be corrected if a parametric degenerative frequency divider is used to restore the input frequency. The divider is a typical second harmonic generator (SHG) that operates in the reciprocal regime, i.e. the second harmonic with frequency $2\omega$ is used as input power and fundamental wave with frequency $\omega$ is used as output power. The divider has the same characteristics as its SHG-counterpart has. In particular, the efficiency of frequency division is equal to 1 theoretically and is greater than 0.9 for the best practical devices.

If a divider is used in the feedback of the generator then the presented amplifier-converter must have index of frequency conversion equal to 2. Then its maximally possible gain G=2. In this case we have $\alpha=0.9$, $G \cong 2$ and $\alpha G>1$, i.e. it is possible to generate coherent light due to the energy of the acoustic wave. Acceptable level of losses in the whole system is 50%.

It should be noted that an efficiency of the divider of about 0.9 is achieved with large levels of light power. The efficiency of the divider with small levels is much less. Thus, it is difficult to excite the generator and additional external power is required to actuate the generator at start up.

Figure 33:
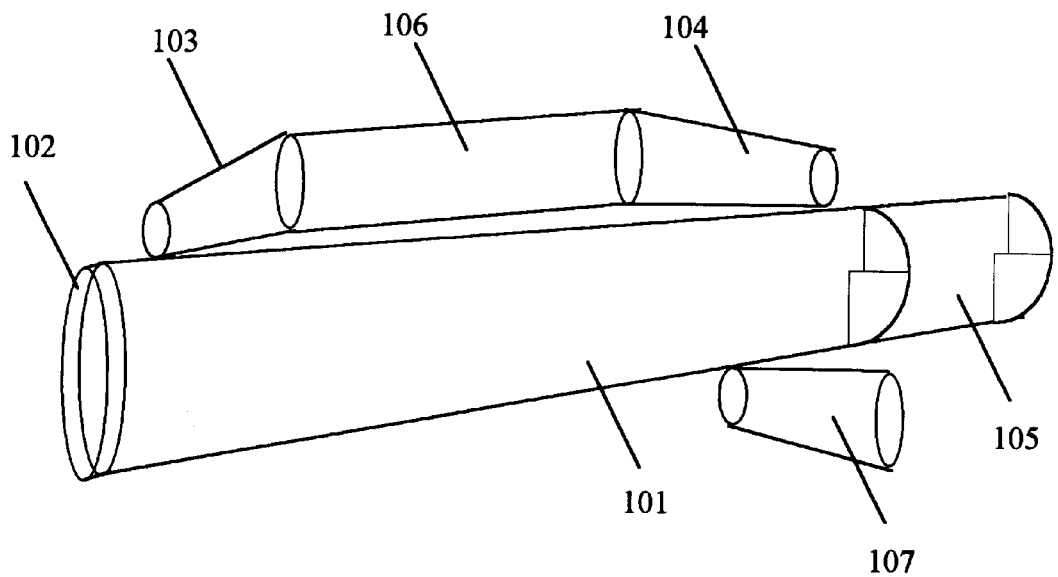
FIG. 33 is an embodiment of the invention.

These considerations are taken into account in the diagrammatic illustration of the sixteenth parametric optical apparatus with acoustic pump shown in FIG. 33. The apparatus illustrated in FIG. 33 comprises a glass body of rotation 101, acoustic transducer 102, input coupling focon 103, output coupling focon 104, and matching load 105. In the example illustrated the body of rotation is a glass cone. A nonlinear crystal 106 is used as the frequency divider. Coupling focon 107 can be used for the initial input of light radiation to actuate the generator. The same focon can be used for extracting the light radiation generated. The wavelength of the output light is determined by divider 106. The divider is a frequency-sensitive device because frequency division requires so called space synchronism between the first and second harmonics. Space synchronism takes place in a narrow range of wavelengths.

It is easy to understand that any wavelengths between the first and second harmonics can be extracted from the generator simultaneously. For this purpose additional coupling focons must be attached in the corresponding places of the main glass cone in which the conversion takes place. Actually, the frequency of light radiation in the cone increases gradually and it is sufficient to attach additional coupling focons in the corresponding points of the glass cone to extract part of the light radiation with frequency that takes place at each point.

The efficiency of the generator is determined mainly by the dissipative losses in the glass of the focon in the wavelength range of one octave. It is very tempting, in this regard, to go into the infra-red range of wavelengths with the use of $SiF_4$ glasses. Because dissipative losses in the visible range of wavelengths for up to date glasses is determined mainly by Reyleigh scattering which is proportional to $1/\lambda^4$, an increase of the light wavelength by 2 times significantly decreases the losses. It is quite realistic, to obtain an amplifier-converter with an efficiency above 0.5 for frequency doubling in this wavelength range. This opens the perspectives of developing generators in which the mechanical energy of the elastic oscillations of an optical medium are transformed into the energy of coherent infra-red radiation directly.

Twenty Ninth Preferred Embodiment

Figure 34:
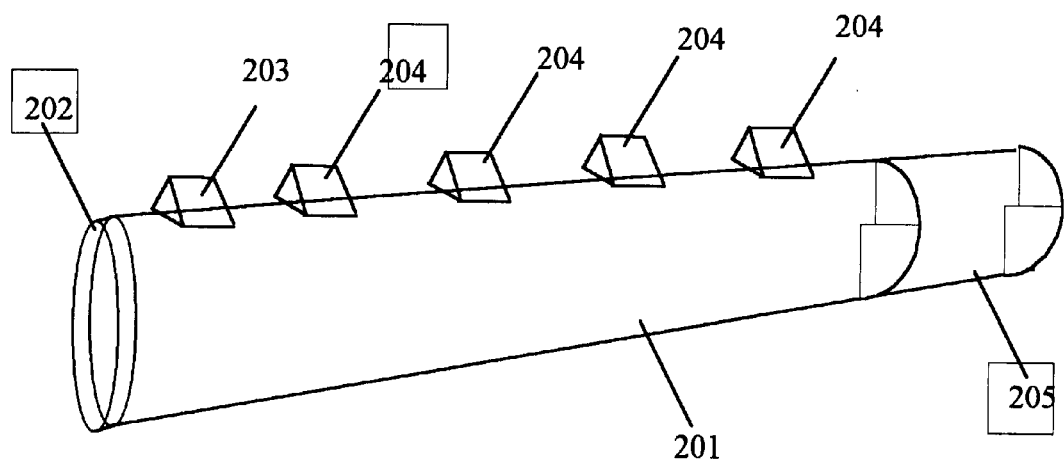
FIG. 34 is an embodiment of the invention.

The apparatus illustrated in FIG. 34 comprises a glass body of rotation 201, acoustic transducer 202, input coupling focon 203, output coupling focons 204, and matching load 205. In the example illustrated the body of rotation is a glass cone. The present invention provides an twenty-ninth parametric optical apparatus with acoustic pump wherein the first to seventeenth inventions are used to provide a generator of WDM signals. Since the wavelength of light radiation decreases gradually as the light radiation propagates along the axis of the waveguide one can extract light radiation of whatever wavelength desired. It is sufficient to locate output coupling devices in the proper places. As is seen in FIG. 30, output coupling devices 204 located along the waveguide enable light radiation with wavelengths that are proportional to the diameter of the cross-section where the coupling devices are located to be obtained. In particular, optical signals which frequencies forms arithmetic progression can be obtained. The number of frequencies N depends on the difference $\Delta f$ between adjacent frequencies and is determined by the following expression $N=f_{max}(\Delta D/D)/\Delta f$, where $f_{max}$ is the maximal frequency of output light radiation, $\Delta D$ is difference between maximal and minimal diameters of cross-sections, D is the maximal diameter. Instead of the coupling prisms 204 shown in FIG. 30 coupling devices of other types can be used. In particularly, means that violate condition of total reflection on the side surface of the waveguide, for example, gratings or scratch can be used.

Thirtieth Preferred Embodiment

The thirtieth preferred embodiment comprises a parametric optical apparatus with acoustic pump comprising a glass body of rotation wherein additional glass coating is used to decrease light losses and to decrease because of this reason the index of the frequency of conversion or/and efficiency of conversion. In general, the refraction index n of a point on a cross-section of the body of rotation depends on the distance from said point to the axis of the body of rotation. Preferably, in an inhomogeneous glass cone, the refraction index n in a cross-section that is perpendicular to the axis of the cone decreases as the distance from the axis increases. This shifts the light field maximums towards the centre of the cone and thus decreases light radiation losses during amplification-conversion due to various imperfections on the conical side surface of the glass cone.

EXAMPLES

Example 1

Consider an AO-switch fabricated from glass (fused quarts) in the shape of a truncated cone with the following parameters:

length L=10 cm,
wide cross-section with the diameter $D_{max}=1.0$ mm,
narrow cross-section with the diameter $D_{min}=0.99$ mm,
frequency of modulation F=100 MHz,
wavelength of the acoustic wave $\Lambda=60\ \mu$,
wavelength of the light wave in glass $\lambda=0.7\ \mu$,
refraction index of the glass n=1.46.

In this case, the dimensionless parameter $\sigma(\Lambda/2\pi)$ (dD/dz)/D$\cong 10^{-6}$ and the index of modulation m of the refractive index must satisfy the following condition m>$\sigma=10^{-6}$. It should be noted that the index of modulation m in conventional AO cells is similar or larger. Actually, the relationship between the index of modulation m and the intensity of the acoustic wave $I_{ac}$ is the following $I_{ac}=2m^2v a^3\rho/(p_{12}n^2)^2$. Here $v_a\cong 6000$ m/s is the velocity of the acoustic wave, $\rho\cong 2200$ kg/m³ is the volume density of glass, $p_{12}\cong 0.27$ is the photo-elastic coefficient for an homogeneous amorphous solid state. Thus, an acoustic wave with power of about 10 mW is required to provide an index of modulation m$\cong 10^{-6}$ in a glass cylinder with diameter 1 mm.

If a light wave is polarized so that the vector of electric field strength is parallel to the axis of the AO cell, the photo-elastic coefficient $p_{11}=0.12$ should be used instead of $p_{12}=0.27$. In this case, the index of modulation m decreases by 2.25 times and the intensity of the acoustic wave must be increased by about 5 times to provide the same effects. However, it is not necessary to provide the same effects for light wave switching, i.e. for reflecting the light wave from a DBR formed by an acoustic wave. It is sufficient to provide indexes of reflection close to 1 in both cases. Since interaction between the acoustic and light waves takes place in a waveguide that confines the propagation of both waves in two directions (that is, the waves propagate in one direction only, unlike in free space where the waves propagate in three directions) a light wave can be reflected practically completely from DBRs with various indexes of modulation. As has been shown previously, the difference in the indexes of reflection $\Gamma$ is practically negligible for different indexes of modulation. Unfortunately, the analogous property is absent in conventional AO cells because a light wave propagates in free space and interacts with an acoustic wave within a certain distance. As a result, an index of reflection close to 1 can be obtained with an appropriate index of modulation. Therefore, an appropriate polarisation of the light wave is required. As far as the "wavelength-independent" property of the switch is concerned, when K=0.01 k, the Bragg condition is valid when $k_=k/200$. On the other hand, $k_=$ depends on the conditions for entering light radiation into the lightguide. If an input coupling device provides $k_==0$ at the entry point, $k_=$ increases monotonically as the light wave moves towards the wide part of the focon in accordance with the following relation $k_{32}$ (z)/k=$(2\gamma s)^{1/2}$ which can be derived from the relations (1-i)-(5-i) and the relation D(s)= $D_e(1+\gamma s)$, where $D_e$ is the diameter of the cross section at the entry point, $\gamma$ characterises the taper of the lightguide, s is the distance from the entry point. In the example $\gamma=10^{-4}$ and $k_==k/200$ at s=⅛ mm. Thus the Bragg condition is satisfied near the entry point where $k_==0$.

If the wavelength of a light wave increases, for example, by 2 times, then k increases by 2 times also and the DBR is shifted closer to the entry points. But, in this case also, the reflective properties of the DBR is preserved.

Thus, one can see that the DBR has high reflectivity with any polarisation and with any wavelength of the light wave. In a lightguide, an acoustic wave acts like a mirror that reflects all light waves with any polarisations and wavelengths.

Example 2

Consider operating the same glass lightguide as an AOTF. Assume that the input coupling device is located near the narrow face of the lightguide and the output coupling device is located near the wide face of the lightguide. Then the propagation constant of the light wave near the wide face is determined by the previously mentioned relation $k_==k(2\gamma s)^{1/2}$ equals 0.14 k. If the propagation constant of the acoustic wave satisfies the condition K<0.28 k, the DBR formed by the acoustic wave is located between the input and output coupling devices. As a result, the input light radiation is not transmitted to the output port. The condition K<0.28 k can be violated either by decreasing k or by increasing K. Since $k=2\pi/\lambda$, $K=2\pi F/v_a$ where $\lambda$, F, $v_a$ are wavelength of the light wave, frequency of the acoustic wave, velocity of the acoustic wave, respectively, k decreases when $\lambda$ increases; and K increases when F increases. Thus, the transmission of light radiation between the input and output ports is dependent on the wavelength of the light wave, firstly, and is dependent on the frequency of the acoustic wave, secondly.

The first circumstance indicates that we have a filter of light wavelength, the second circumstance indicates that the filter is a tuneable one. The wavelength range $\lambda_{max}/\lambda_{min}$ in which the filter is tuned is equal to the frequency range $F_{max}/F_{min}$ in which the frequency of the acoustic wave can be changed, i.e. $\lambda_{max}/\lambda_{min} > 10$ can be obtained.

As is understood by a person skilled in the art, the preferred embodiment of the present invention is illustrative of the present invention rather than being limiting of the present invention. Revisions and modifications may be made to methods, processes, materials, structures, shapes and dimensions through which is formed a device formed in accord with the present invention as defined by the appended claims.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

In general, in this disclosure, an AO cell is a sound guide. Typically, the sound guides used in this invention are wave guides suitable for functioning as both sound guides and light guides.

What is claimed is:

1. An acousto-optical device comprising a body and an acoustic transducer;
    said body comprising
        a first end, said first end having a first central point;
        a second end, said second end having a second central point; and,
        an axis, said axis being perpendicular to said first end and extending from said first central point to said second central point;
    said acoustic transducer being attached to said body;
    wherein any cross-section of said body, cut perpendicular to said axis, defines a plane geometrically similar to said first end,
    wherein said body tapers from said first end to said second end,
    wherein said body is manufactured from optical material,
    wherein, along any line drawn perpendicular to said axis, the index of refraction of said optical material decreases as the distance from said axis increases along said line, and
    wherein said acoustic transducer is placed in the electromagnetic field of a cylindrical metal cavity in which a rotating resonator mode is excited by means of a directional coupler.

2. An acousto-optical device comprising a body, a first input coupler, a first output coupler and a divider;
    said body comprising
        a first end, said first end having a first central point;
        a second end, said second end having a second central point; and,
        an axis, said axis being perpendicular to said first end and extending from said first central point to said second central point,
    said first input coupler suitable for entering light energy into said device;
    said first output coupler suitable for extracting light energy from said device;
    said divider comprising two ends, one end of said divider being attached to said first output coupler and the other end of said divider being attached to said first input coupler;
    whereby said divider receives light energy extracted from said device through said first output coupler and transmits light energy to first input coupler.

3. The device of claim 2 wherein said divider is a second harmonic generator that operates in the reciprocal regime, whereby the frequency of the input power for the divider is twice the frequency of the output power of the divider.

4. The device of claim 2 further comprising a second input coupler for entering initial power to the device.

5. A method of employing an acousto-optic device to function as desired, said method comprising:
    selecting a desired function,
    selecting a suitable glass body, wherein the rate of attenuation of light radiation is sufficiently low to permit the selected desired function, and wherein the tapering equation of the selected glass body is satisfied and the taper is sufficiently gradual to permit the selected desired function,
    selecting at least one input coupler,
    selecting at least one output coupler,
    selecting an acoustic transducer,
    selecting an acoustic wave,
    selecting a light wave,
    using a selected acoustic transducer to excite said selected acoustic wave into said selected glass body,
    using an input coupler to introduce said selected light wave into said selected glass body,
    wherein said glass body is manufactured from optical glass material, said optical glass material having a sufficiently low rate of attenuation of light radiation to be suitable for the selected desired function of said device,
    wherein said glass body comprises a first end, a second end, a longitudinal axis and a perimeter surface,
        said first end comprising a first end perimeter and a first end center,
        said second end comprising a second end perimeter and a second end center,
        said longitudinal axis extending from said first end center to said second end center,
        said perimeter surface extending from said first end perimeter to said second end perimeter,
        wherein a cross section of said glass body is a plane perpendicular to said longitudinal axis,
        wherein said glass body serves as a wave guide for at least one acoustic wave and at least one light wave; wherein said glass body tapers from said first end to said second end such that the area of said cross sections decreases as the distance of a cross section from said first end increases, said taper being sufficiently gradual to permit an interaction of an acoustic wave and a light wave, said interaction being suitable for the selected desired function of said device,
    wherein each input coupler is suitable for entering light energy into said device,
    wherein each output coupler is suitable for extracting light energy from said device,
    wherein said selected acoustic wave controls and interacts with said selected light wave introduced into said body to create an environment suitable for the selected desired function, whereby said device functions as desired.

6. An acousto-optic device comprising:

a suitable glass body, at least one input coupler, at least one output coupler, at least one acoustic transducer, at least one acoustic wave, at least one light wave, wherein said glass body is manufactured from optical glass material, wherein said glass body comprises a first end, a second end, a longitudinal axis and a perimeter surface,
  said first end comprising a first end perimeter and a first end center,
  said second end comprising a second end perimeter and a second end center,
  said longitudinal axis extending from said first end center to said second end center,
  said perimeter surface extending from said first end perimeter to said second end perimeter, wherein a cross section of said glass body is a plane perpendicular to said longitudinal axis, wherein said glass body serves as a wave guide for at least one acoustic wave and at least one light wave;

wherein said glass body tapers from said first end to said second end such that the area of said cross sections decreases as the distance of a cross section from said first end increases, said taper being sufficiently gradual to permit an interaction of an acoustic wave and a light wave, said interaction being suitable for the selected desired function of said device, wherein the rate of attenuation of light radiation in said glass body is sufficiently low to permit a desired function, wherein the tapering equation of said glass body is satisfied such that the taper is sufficiently gradual to permit said desired function, wherein an acoustic transducer excites an acoustic wave into said glass body, wherein an input coupler introduces a light wave into said glass body, wherein each input coupler is suitable for entering light energy into said device, wherein each output coupler is suitable for extracting light energy from said device, wherein said selected acoustic wave controls and interacts with said selected light wave introduced into said body to create an environment suitable for the selected desired function, whereby said device functions as desired.

* * * * *